US010089583B2

(12) United States Patent
Chen

(10) Patent No.: US 10,089,583 B2
(45) Date of Patent: Oct. 2, 2018

(54) DISTRIBUTED CLOUD SERVICES SYSTEM AND USES THEREOF

(71) Applicant: Shuang Chen, Somers, NY (US)

(72) Inventor: Shuang Chen, Somers, NY (US)

( * ) Notice: Subject to any disclaimer, the term of this patent is extended or adjusted under 35 U.S.C. 154(b) by 1207 days.

(21) Appl. No.: 14/180,092

(22) Filed: Feb. 13, 2014

(65) Prior Publication Data

US 2014/0229335 A1 Aug. 14, 2014

Related U.S. Application Data

(60) Provisional application No. 61/764,143, filed on Feb. 13, 2013.

(51) Int. Cl.
*G06Q 30/00* (2012.01)
*G06Q 10/02* (2012.01)
*G06Q 30/02* (2012.01)

(52) U.S. Cl.
CPC ......... *G06Q 10/02* (2013.01); *G06Q 30/0269* (2013.01)

(58) Field of Classification Search
CPC .................................................. G06Q 30/0623
USPC ....................................................... 705/26.61
See application file for complete search history.

(56) References Cited

U.S. PATENT DOCUMENTS

| 5,832,452 | A | 11/1998 | Schneider et al. |
|---|---|---|---|
| 7,136,857 | B2 | 11/2006 | Chen et al. |
| 7,150,015 | B2 | 12/2006 | Pace et al. |
| 7,181,731 | B2 | 2/2007 | Pace et al. |
| 7,209,921 | B2 | 4/2007 | Pace et al. |
| 7,430,610 | B2 | 9/2008 | Pace et al. |
| 7,685,183 | B2 | 3/2010 | Pace et al. |
| 7,685,577 | B2 | 3/2010 | Pace et al. |
| 7,752,214 | B2 | 7/2010 | Pizzorni et al. |
| 8,326,883 | B2 | 12/2012 | Pizzorni et al. |
| 8,386,525 | B2 | 2/2013 | Pace et al. |
| 8,443,035 | B2 | 5/2013 | Chen et al. |

(Continued)

OTHER PUBLICATIONS

Law, Rob, and Cathy H. C. Hsu. "Customers' Perceptions on the Importance of Hotel Web Site Dimensions and Attributes." International Journal of Contemporary Hospitality Management, vol. 17, No. 6, 2005, pp. 493-503. (Year: 2005).*

*Primary Examiner* — Alexis M Casey
(74) *Attorney, Agent, or Firm* — Benjamin Aaron Adler

(57) ABSTRACT

Provided herein is a non-transitory computer readable medium comprising software configured to enable instructions to create of a multidimensional value model for an event, such as, a travel event. When executed information related to events from all sources is stored and categorized according to the source, value dimension and value description of the event are established and used to create an initial multidimensional value model. If the event is a travel event, the initial model is updated according to user-selected travel events and a recommendation for travel made to the user based on the updated model. Also provided is a distributed cloud computer system that integrates cloud computing with a Distributed Internet Services system and cloud computing methods, particularly, for improving user experience during e-commerce transactions. A non-transitory storage medium tangibly stores processor-executable instructions to execute the methods.

8 Claims, 12 Drawing Sheets

(56) References Cited

U.S. PATENT DOCUMENTS

| | | | |
|---|---|---|---|
| 8,458,115 B2* | 6/2013 | Cai | G06F 17/30707 706/52 |
| 8,458,142 B2 | 6/2013 | Pace et al. | |
| 8,458,222 B2 | 6/2013 | Bobick et al. | |
| 8,473,468 B2 | 6/2013 | Pace et al. | |
| 8,527,545 B2 | 9/2013 | Bobick et al. | |
| 8,650,226 B2 | 2/2014 | Bobick et al. | |
| 8,666,933 B2 | 3/2014 | Pizzorni et al. | |
| 8,713,062 B2 | 4/2014 | Bobick et al. | |
| 8,996,530 B2* | 3/2015 | LuVogt | G06F 17/30867 707/740 |
| 9,098,881 B2* | 8/2015 | Ciabrini | G06Q 50/14 |
| 9,400,186 B1* | 7/2016 | Bank | G01C 21/3484 |
| 2002/0082877 A1* | 6/2002 | Schiff | G06Q 10/02 705/5 |
| 2003/0018694 A1* | 1/2003 | Chen | G06F 8/60 709/200 |
| 2005/0004830 A1 | 1/2005 | Rozell et al. | |
| 2011/0208425 A1* | 8/2011 | Zheng | G01S 19/14 701/532 |
| 2011/0320113 A1* | 12/2011 | Tate, Jr. | G01C 21/3469 701/431 |
| 2012/0158622 A1* | 6/2012 | Mital | G06Q 50/01 706/12 |
| 2013/0036126 A1 | 2/2013 | Anderson | |
| 2013/0054375 A1* | 2/2013 | Sy | G06Q 10/02 705/14.66 |
| 2013/0290339 A1* | 10/2013 | LuVogt | G06F 17/30867 707/740 |

* cited by examiner

DISTRIBUTED CLOUD SERVICES SYSTEM AND USES THEREOF

CROSS-REFERENCE TO RELATED APPLICATIONS

This application is a nonprovisional under 37 C.F.R. § 1.119(e) of provisional application U.S. Ser. No. 61/764,143, filed Feb. 13, 2013, now abandoned, the entirety of which is hereby incorporated by reference.

BACKGROUND OF THE INVENTION

Field of the Invention

The present invention relates generally to the fields of distributed internet services and middle ware, cloud computing services and computer models and their integration to enhance online commerce systems. More specifically, the present invention relates to computer systems, platforms, models and methods related to improving user experience with e-commerce systems in real time, such as transportation and the travel industry.

Description of the Related Art

The Internet has largely leveled the ground for delivery of application and information services. As a result, service providers, including online application/information providers, traditional application service providers (ASPs), network service providers, content/application delivery network (CDN/ADN) providers and device OEMs using embedded intelligent service functions, constantly seek ways to differentiate their products to grow market shares. The relatively new Cloud Computing technology enables many of the sub-systems of an enterprise application system, that are traditionally implemented with their own computing facilities, to be physically located within a centralized computing facility through "virtualization" technology, thus saving tremendous amount of computing power than each using a separate computing facility.

In the current host-centric multi-tier client-server service model, even with the cloud center consisting of a farm of servers, an Internet application is typically served through a sequence of interactions between the application-hosting server and a user's browser client over the Internet. The hosting server or a server farm usually serves multiple requests from a large number of browser clients anywhere over the Internet at any given time. Because the transmission of the sequence of interactions relies completely on the real-time performance across the entire network path between the server and any particular browser client, and the performance is often affected by factors that are beyond what the server, client and network carriers can control, e.g., data traffic, wireless network availability and bandwidth, it is impossible for the service provider to provide the quality and reliability guarantee to the end users. Most of today's mobile applications, which rely on the specific client software instead of a generic browser, also share similar limitations.

For example, a railway e-ticket application system is used to provide all e-ticket related functions for serving railway passengers and the railway operators. A railway e-ticket is usually a complicated system, partially because the complexity of functions and partially because the physical implementation of the system involves a number of sub-systems requiring integration over wide-area networks connecting many stations, ticketing offices or windows and terminals, websites, and control centers and operator offices, etc. The wide geographic area requiring network coverage and requirements for meeting the real-time performance, liability, maintainability, scalability, security and the flexibility for frequent functional upgrade for the entire system are extremely challenging, particularly when a railway network covers a geographic area of tens of thousands or more square miles and serves a market of millions. On average millions of railway tickets are sold each day through multiple sales channels, with with twice the volume over several peak periods of time during a year.

In another example, for e-travel applications, to find the best match from the ocean of information is largely handled by the general search engine, for example, at www.google.com, or a vertical search engine, such as www.travelocity.com, where the traveler enters the desired destination, and/or a set of given parameters and the search engine finds or recommend the best matches available from the web. Various models have been used in such search engine approach such as remembering what the traveler searched last time and, based on the traveler's search content, recommending related information, etc. While the search engine approach greatly expands the information scope and enables anyone not from the travel industry to find what s/he likes by themselves, anytime and anywhere, there are limitations. There is a huge amount of effort and time needed to handle all the information from the Internet in order to really understand the target destination and to find the best match. Moreover, to speed up the matching process, the description of a travel event has been more and more normalized using a simple set of parameters, thereby commoditizing the originally sophisticated event. This makes the match less meaningful and even more time consuming compared with the "expert" travel agent approach.

Thus, there is a need in the art for improvements in providing distributed Internet service models that integrates cloud computing technology, multi-tiered client/server technologies, two-tier browser/server technology for the design and implementation of a general enterprise application system. Specifically, the prior art is deficient in a Distributed Cloud Services system and models that provide stable system performance under a large volume of customer inquiries and transactions in real-time. The present invention fulfills this long-standing need and desire in the art.

SUMMARY OF THE INVENTION

The present invention is direct to a non-transitory computer readable medium that comprises software for creating a multidimensional value model for an event, which when executed uses at least one computer having at least a memory, a processor and a network connection. The software is configured to enable instructions to a) receive information related to one or more events of interest from all available sources, b) store and categorize the event and information related thereto in a raw information library, c) establish a value dimension and value description of the event and d) create an initial multidimensional value model for the event from the value dimension and the value description.

The present invention is directed to a related computer readable medium where the further configured to enable instructions to, in real time e) receive events selected by a user, f) modify the value dimension and value description of the user-selected event in the multidimensional value model and g) present the modified multidimensional value model to the user as a best travel recommendation based on the user's selections.

The present invention is directed to another related computer readable medium where the event is a travel event and the computer readable medium is further configured to enable instructions to, in real time, e) receive events selected by a user, f) modify the value dimension and value description of the user-selected event in the multidimensional value model and g) present the modified multidimensional value model to the user as a best travel recommendation based on the user's selections.

The present invention also is directed to a computer program product tangibly embodied in the non-transitory computer readable medium described herein.

The present invention is directed further to a user-implemented method for travel planning in real time on an electronic device having at least a processor, a memory and a network connection. The method comprises a) inputting into the electronic device one or more travel events for a selected travel region of interest, b) updating an initial multidimensional value model of the travel event based on the selected travel events and region and c) outputting in real time a best recommendation for travel to the region of interest based on the updated multidimensional value model. The present invention is directed to a related method further comprising inputting one or more additional or revised travel events and repeating steps b and c, as described supra, on the updated multidimensional value model.

The present invention is directed further still to a distributed cloud computer system comprising at least one processor, at least one memory in communication with the processor and at least one network connection, said memory tangibly storing instructions, when executed by the processor are configured to a) receive an input over the network connection and, via a Distributed Internet Services (DIS) system, b) distribute an application or components thereof configured to process the input that is located in a central cloud server to a target on a selected client tier, c) deploy the distributed application or components thereof at the target; and d) synchronize any data on the client tier with the central server. The present invention is directed to a related distributed cloud computer system that is configured to execute further instructions to process the input with the deployed application or components thereof at the target to produce an output and transmit the output over the network connection.

The present invention is directed further still to a method for improving user experience during an e-commerce transaction that utilizes the distributed cloud computer system described herein.

The present invention is directed further still to a method for cloud computing in real time. The method comprises receiving input from an electronic device having at least a memory, a processor and a screen that is connected to a central cloud server through a network connection. An application or components thereof configured to process the input and stored on the central cloud server is distributed over a Distributed Internet Services system to the electronic device and deployed. The deployed application or components are executed to process the input and a response based on the processed input is displayed on the electronic device in real time.

The present invention is directed further still to a non-transitory storage medium tangibly storing processor-executable instructions to perform the methods described herein.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1A:
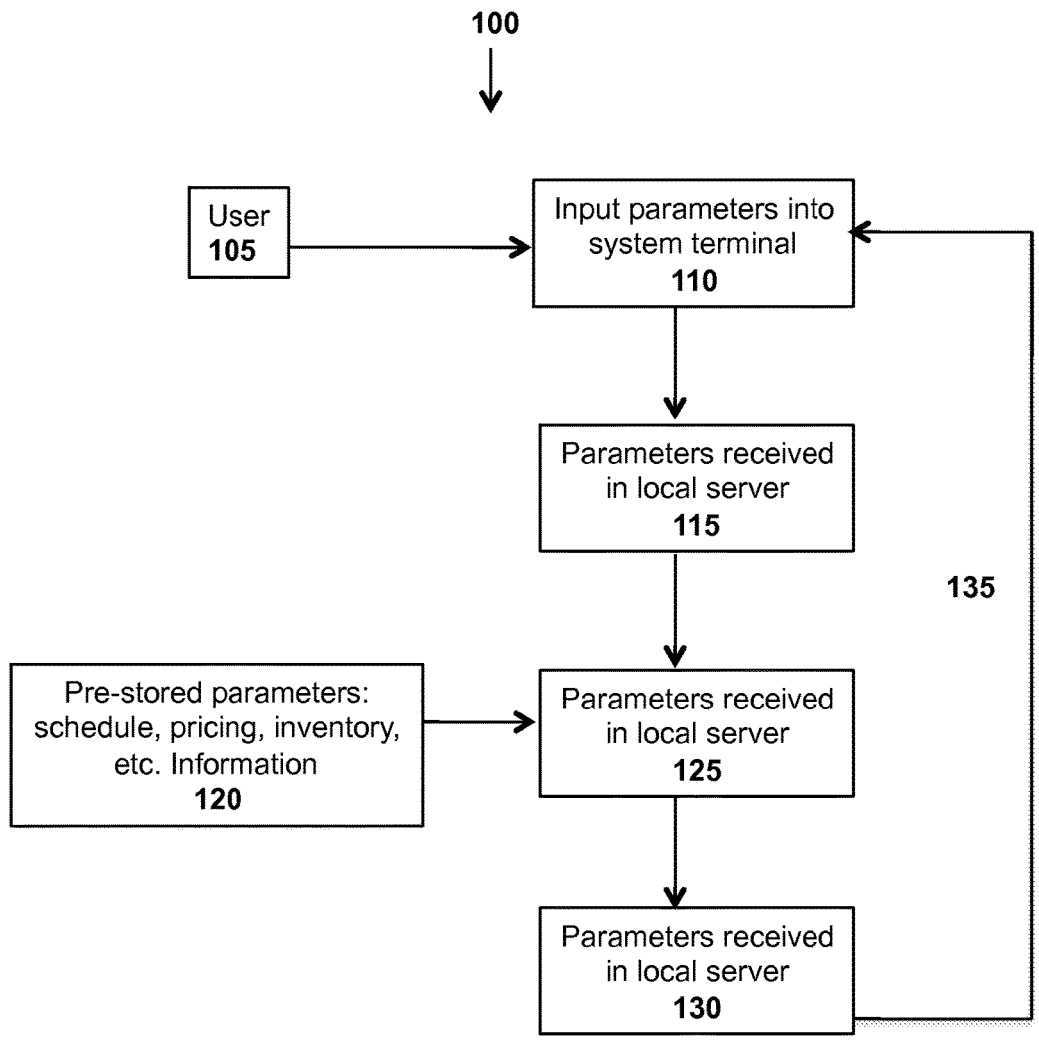
FIGS. 1A-1C are flowcharts illustrating the processes of inquiry (FIG. 1A), booking (FIG. 1B) and boarding with (FIG. 1C) a railway e-ticket via a multi-tiered Client/Server system.

As used herein, the term "a" or "an" when used in conjunction with the term "comprising" in the claims and/or the specification may mean "one," but it is also consistent with the meaning of "one or more," "at least one," and "one or more than one." Some embodiments of the invention may consist of or consist essentially of one or more elements, method steps, and/or methods of the invention. It is contemplated that any method described herein can be implemented with respect to any other method described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, the term "computer" generally includes: a processor, a memory, at least one information storage/retrieval apparatus such as, for example, a hard drive, a disk drive or a flash drive or memory stick, or other non-transitory computer readable media or non-transitory storage device, as is known in the art, at least one input apparatus such as, for example, a keyboard, a mouse, a point and touch device, a touch screen, or a microphone; and a display structure, such as the well-known computer screen. Additionally, the computer may include one or more network connections, such as wired or wireless connections. Such a computer or computer system may include more or less than what is listed above and encompasses other electronic media or electronic devices, as is known in the art, for example, but not limited to tablet computers or smart devices.

As used herein, the term "cloud" or "cloud computing" refers to a centralized and virtualized computing facility in which all the computing resources are shared there. One can no longer point to a specific machine for an application system or sub-system because they are all in the "cloud".

As used herein, the term "Distributed Internet Services system" refers to a distributed Internet service platform that transforms Internet applications to perform in various computing environments. A DIS system distributes Internet applications, including content, data and logic, to whatever extent appropriate and to any number and any kind of device across the network, via a Component Distribution Server/Asset Distribution Server. Through DIS, Internet applications can be hosted and managed centrally, with services based on each user's need, and cached and executed locally at the user device or nearby locations while maintaining its integrity. Any web-enabled computing device can be upgraded with the DIS software to become DIS-enabled to enjoy and perform distributed Internet services. The Distributed Internet Services system is completely described in any one of a family of patents of U.S. Pat. Nos. 7,136,857, 7,150,015, 7,181,731, 7,209,921, 7,430,610, 7,685,183, 7,685,577, 7,752,214, 8,326,883, 8,386,525, 8,443,035, 8,458,142, 8,458,222, 8,473,468, 8,527,545, and 8,650,226 and U.S. Patent Publication Nos. 20120005205 and 20130091252, all of which are commonly owned by OP40, Holdings, Inc., as is the instant application, and all of which are hereby incorporated by reference.

As used herein, the term "travel event" refers to a category of activity queries, such as, but not limited to, where to eat, which returns restaurants, where to stay which returns hotels, inns, bed and breakfasts, etc., where to find entertainment, which returns a variety of venues, what to see, which returns points of interest, tours, etc. Other queries such as what transportation is available or are travel packages available can be treated as a travel event. The term "travel event" can also refer to business oriented queries, such as, where to meet, which returns conference or convention venues.

As used herein, the term "multi-dimensional value model (MDV model) refers to a model where each dimensional represents an independent feature and the numeral content of the dimension represents the quantified value of the feature. Generally, the larger the numeral value, the higher the value of the feature. The content of all the dimensions are normalized for the ease of representation.

In one embodiment of the present invention there is provided a non-transitory computer readable medium comprising software for creating a multidimensional value model for an event, which when executed using at least one computer having at least a memory, a processor and a network connection, is configured to enable instructions to a) receive information related to one or more events of interest from all available sources; b) store and categorize the event and information related thereto in a raw information library; c) establish a value dimension and value description of the event; and d) create an initial multidimensional value model for the event from the value dimension and the value description.

Further to this embodiment, the computer readable medium is configured to enable instructions to update the multidimensional value model via iteration of steps a to d, as described supra. In another further embodiment, the event may be a travel event such that the computer readable medium is configured to enable instructions to, in real time e) receive events selected by a user; f) modify the value dimension and value description of the user-selected event in the multidimensional value model; and g) present the modified multidimensional value model to the user as a best travel recommendation based on the user's selections. Further still, the computer readable medium is configured to enable instructions to add the user-selected event and related information to the raw information library, if not found in the initial multidimensional model, prior to step f. Further still, the computer readable medium is configured to enable instructions to enable instructions to reiterate steps e to g, as described supra, upon additional event selection.

In one aspect of all embodiments the instruction to enable step c may be configured to analyze each item of information based on a pre-defined dictionary to establish an initial set of value dimensions of an event; convert the value description into a numerical value via a pre-defined text-value matching table; and add a weight for each item of information to the value description and the value dimension via a pre-defined weight-value table. In another aspect to enable step d may be configured to multiply the weight with the numerical value for each item of information. In all embodiments and aspects thereof each item of information related to the event may be categorized by the source.

In a related embodiment of the present invention there is provided a computer program product, tangibly embodied in the non-transitory computer readable medium described supra.

In another embodiment of the present invention there is provided a user-implemented method for travel planning in real time on an electronic device having at least a processor, a memory and a network connection, comprising the steps of a) inputting into the electronic device one or more travel events for a selected travel region of interest; b) updating an initial multidimensional value model of the travel event based on the selected travel events and region; and c) outputting in real time a best recommendation for travel to the region of interest based on the updated multidimensional value model.

In a further embodiment user-implemented method comprises inputting one or more additional or revised travel events; and repeating steps b and c, as described supra, on the updated multidimensional value model. In both embodiments the initial multidimensional value model may comprise weighted values for each item of information comprising the travel event.

In yet another embodiment there is provided a distributed cloud computer system comprising at least one processor, at least one memory in communication with the processor and at least one network connection, said memory tangibly storing instructions, when executed by the processor are configured to a) receive an input over the network connection; and via a Distributed Internet Services (DIS) system, b) distribute an application or components thereof configured to process the input that is located in a central cloud server to a target on a selected client tier; c) deploy the distributed application or components thereof at the target; and d) synchronize any data on the client tier with the central server.

Further to this embodiment the distributed cloud computer system comprises processor executable instructions to process the input with the deployed application or components thereof at the target to produce an output; and transmit the output over the network connection. In both embodiments the input may comprise an e-commerce transaction.

In yet another embodiment there is provided a method for improving user experience during an e-commerce transaction, comprising the steps of receiving a user inquiry as input into an e-commerce system networked to a central cloud server comprising the distributed cloud computer system, as described supra; processing the inquiry with an application or components thereof distributed and deployed to a local server on the e-commerce system from the central server via the Distributed Internet Services system; and displaying a response to the inquiry to the user in real time, thereby improving the experience for the user. In this embodiment the e-commerce transaction may comprise buying a ticket, planning a trip, banking, or purchases.

In yet another embodiment there is provided a method for cloud computing in real time; comprising the steps of receiving input from an electronic device having at least a memory, a processor and a screen that is connected to a central cloud server through a network connection; distributing an application or components thereof, configured to process the input, stored on the central cloud server over a Distributed Internet Services system to the electronic device; deploying the distributed application or components; executing the deployed application or components to process the input; and displaying a response based on the processed input on the electronic device in real time. In this embodiment the input may comprise an e-commerce transaction. Representative examples of an e-commerce transaction are buying a ticket, planning a trip, banking, or purchases.

In yet another embodiment there is provided a non-transitory storage medium having tangibly stored thereon instructions that, when executed by at least one processor of an electronic device, cause the electronic device to perform the method as described supra.

Provided herein is a Distributed Cloud Services system, computer systems, platforms, models, and applications comprising the same and methods of use thereof utilized in the design and implementation of enterprise application systems. Representative examples of such systems are, but not limited to, retail systems, such as department store chains, financial systems, such as ticketing systems, such as railway e-ticket systems, banks with branch offices chains and web-based systems, such as, corporate-wide Human Resource application systems, online banking systems, catalog-based shopping, and travel planning systems, for example, a user-implemented personalized trip planning system.

In these systems, computer systems, applications, and methods, the Distributed Internet Services system technology organically integrates the benefits of existing cloud computing technology, which is based on virtualizing centrally located computing resources, the multi-tier Client/Server technology, which are based on DIS tiers, and the Browser/Server technology by selectively distributing the originally central server-located logic and data and by supporting the synchronization between the distributed tiers and the central tier. The Distributed Cloud Services system is utilizable on any kind of electronic device, for example, but not limited to, edge servers, end-user PCs, laptops, pads and smart phones, as are known in the art.

In a particular embodiment the Distributed Cloud Services system or platform provides stable system performance for railway e-ticketing services under a very large volume of customer inquiries and transactions. The DCS system is configured to maintain the real-time performance and the data integrity during performance within the entire system across the wide-area network. Moreover, the DCS platform still provides the flexibility of functional upgrade across the entire system.

In another particular embodiment the present invention provides a multi-dimensional value model for user-implemented personalized journey planning, referred to as MyTripService (MTS), that more precisely describes a travel event. The MDV utilizes the selection process to establish and augment a similar model to reflect the traveler's desire, and recommends the best choices among the large number of options based on the match between the models of the travel events and the traveler's desire. The multi-dimensional value model greatly reduces the efforts and time to find the best match. With the ever increasing amount of information and the constantly changing market of travel events, the Multidimensional Value Model can, through backend data processing and event preparation, quickly find the best matched event, make a recommendation to the traveler, and interactively reach the official website of the selected travel event selection all the while further updating the traveler's MDV model.

Distributed Internet Services System

Technically, DIS technology transforms a part of or the entire Internet application based on the differences between the computing environments of its hosting server and any targeted device, and proactively distributes, deploys, synchronizes the transformed application onto the targeted device across a wired or wireless network, and manages the entire life cycle of the distributed application. As a distributed middleware platform DIS enables an application, to the largest extent possible, to execute in a multi-tiered fashion across the network and makes it as close as possible to the end user. As such, it allows an internet application to be designed, deployed, hosted and managed centrally, but executed in a massively distributed fashion through the quality-guaranteed services across the network, wired and wireless, all the way to end-user's devices.

With the DIS platform, every element, i.e., digital asset or asset, of an application including content, logic and data is treated separately but uniformly. First the application is analyzed with the help of DIS utility tools so that every digital asset associated with the application is identified from the original hosting environment, i.e., the source. Then a packaging profile is generated for each asset that describes all necessary characteristics and service policies that are required for its distribution. Based on that profile, each asset is acquired, packaged and transformed into a neutral form, version-controlled and stored within the DIS repository. The application is thus "virtualized".

Next, based on the designated service requirements, each packaged asset is again transformed onto the targeted computing environment, distributed and deployed onto the target device via a Component Distribution Server/Asset Distribution Server. At that point, the distributed application is ready to use. Meanwhile DIS synchronizes the distributed version of the asset with the one at the source environment, in either direction, based on requirement defined by the application service policies.

The distribution, synchronization, deployment and purging can be done with any designated schedule and service policy for each specific asset based on the requirements to the integrity of the application, security and associated role in the application as well as the optimal use of network computing resources. For instance, one may adjust the amount and type of digital assets that are distributed to an end user device based on the characteristics of that device, the application and the network path. At the targeted device, i.e., target, the DIS manages the use of each distributed asset. The feedback may provide valuable information about the usage of the target-serviced applications.

The DIS platform serves each application based on pre-determined requirements defined in the application asset profiles. The profile describes each asset, its association, grouping and roles with various applications, as well as the required level of services and policies for every step of the life cycle of each asset. The profile can be updated in real-time, allowing service providers to leverage the entire network computing resources to best serve its customers' needs. The DIS platform software resides at various tiers of the network, communicates using its own virtual private network protocols among itself, and can be cascaded for scalability. Thus all service functions of the DIS platform are carried out at various nodes of the network in a distributed and robust fashion utilizing the computing resources across the network.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

Figure 1B:
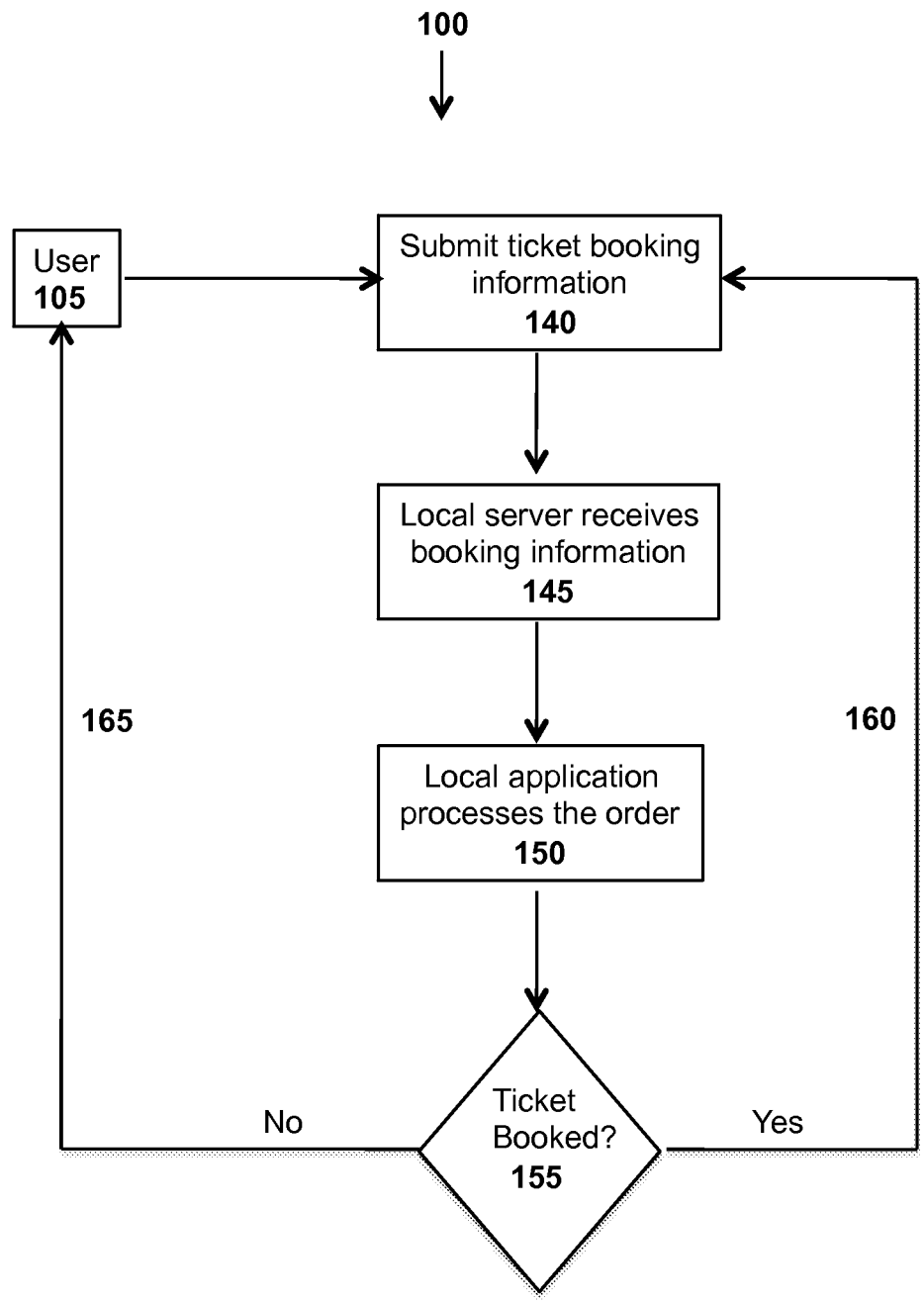
Figure 1C:
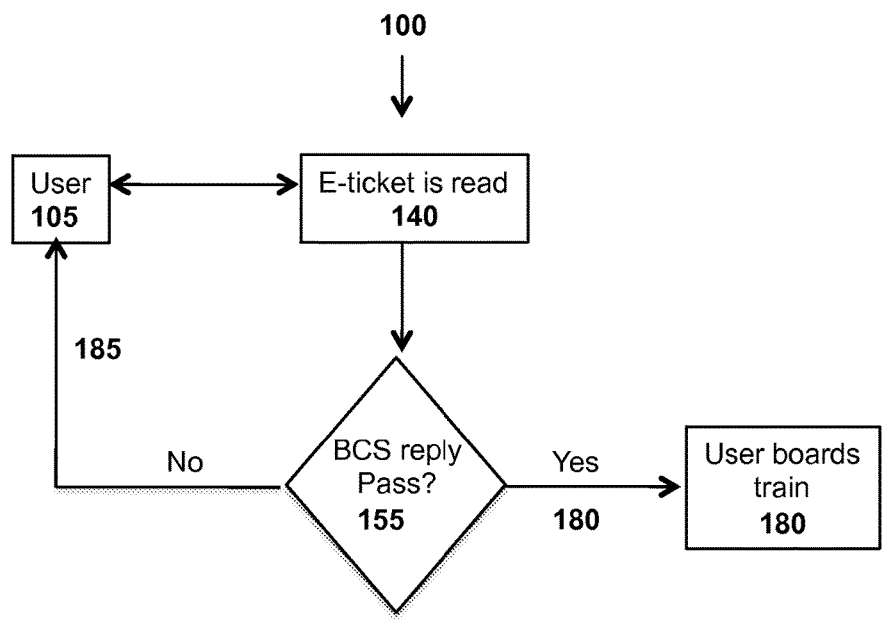

FIGS. 1A-1C depict the steps in a flowchart of acquiring a railway e-ticket via the multi-tier Client/Server system. The multi-tier Client/Server system can be used to meet the high performance requirement at each of the branch locations where the customer transaction occurs while maintaining the data integrity, security, etc. across the entire system (usually can be implemented within a corporation's internal network), but the system usually takes long time to design and implement since its system functions have to be completed across multi-tier sub-system across the network. Further, once it's implemented, it takes a large effort to upgrade or modify its functionalities since it involves the changes in many subsystems.

The process 100 of acquiring and using a railway e-ticket generally encompasses the steps of Inquiry, Booking, and Boarding. In FIG. 1A when inquiring about a railway e-ticket a user 105 accesses the system terminal to input at least the parameters comprising origin and desired destination and date at 110. The application in the local server tier receives the parameters at 115 and retrieves at 125 certain schedule, pricing and inventory information from an inventory quota 120 that is pre-determined for the local server and that are pre-stored in the local server tier. The local application compiles the reply at 130 and responds to the user at 135 by displaying on the system terminal 110 the information to book the ticket in real-time with guaranteed performance. However, in the client/server system, the local server doesn't have the data for the entire system, only the pre-allocated quota of inventory 120, but the local server provides guaranteed response time and application performance.

In FIG. 1B to book the ticket, the user 105 submits the ticket booking information on the system terminal at 140. The local server receives the booking information at 145 from the system terminal and the local application processes the order at 150. If the booking is successful at 155, confirmation is sent to the user at 160 and displayed at the system terminal 140. If the ticket is not booked at 155, the user is informed at 165 whereupon the user may make another inquiry at 110 or exit the system.

In FIG. 1C, for boarding the train the e-ticket is handed to a gate operator or machine read at 170. The ticket may comprise a magnetic strip, may be paper with a bar code or may be an RFID-based card or paper. The boarding control system receives the data encoded on the ticket and compares the same to that pre-stored on the local server. If the BCS system passes the ticket, the user boards the train at 180. If the BCS system cannot match the encoded ticket data with the pre-stored information, the ticket fails at 185 and the user cannot board the train. Since the ticket data is already pre-stored in the local server of the BCS system, the response is real-time.

Figure 2A:
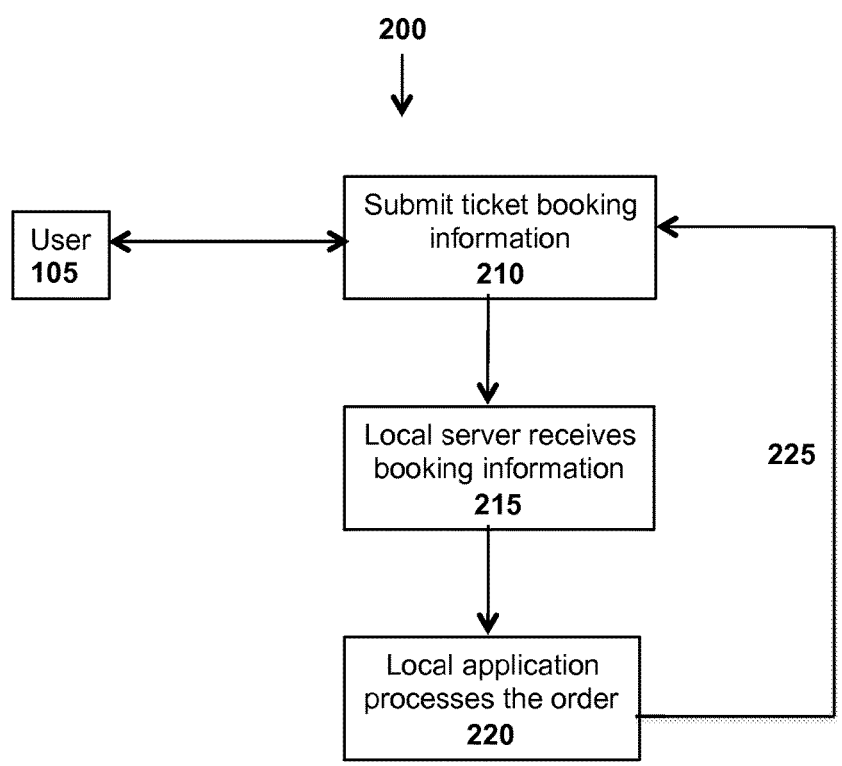
FIGS. 2A-2B are flowcharts illustrating the processes of inquiry (FIG. 2A) and booking (FIG. 2B) a railway e-ticket via a two-tiered Browser/Server system.
Figure 2B:
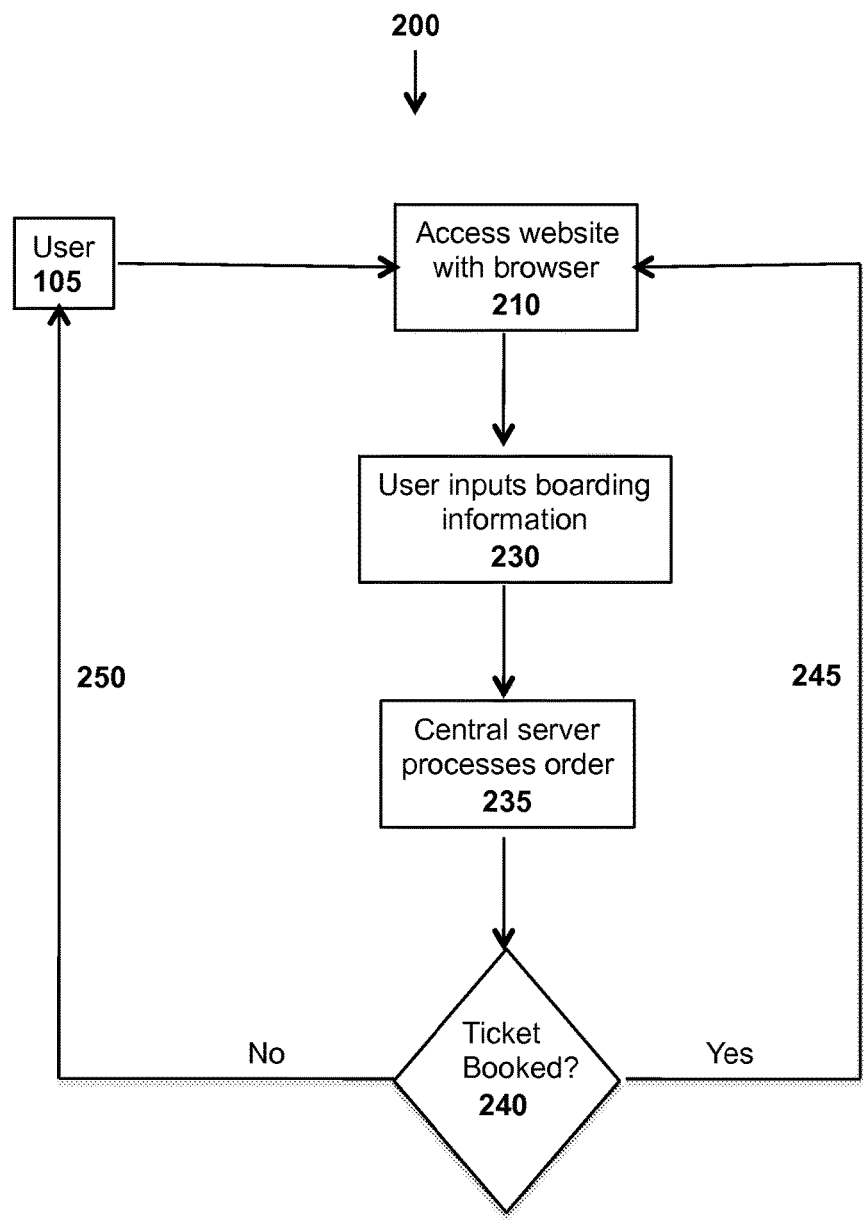

FIGS. 2A-2B depict the steps in a flowchart of acquiring a railway e-ticket via the two-tiered Browser/Server system. This system can be utilized in enterprise systems because of Internet-based commerce. The Browser/Server system can meet the fast development and upgrade of Internet-based commerce, has flexibility with change of system functions, and maintains the data integrity since all the applications and data reside mainly in the central system. The customer uses the browser to access the system across the Internet anywhere and at anytime. But the system implemented using the Browser/Server system cannot provide the guaranteed performance at the customer end. The Internet environment is uncontrollable, neither by the enterprise nor by the customer, in terms of single strength, i.e., the "connection", especially in a wireless network environment, with real-time traffic volume, server loads, i.e., the number of requests to the server at any given time, security over the Internet, such as a DDoS attack, etc.

The process 200 of acquiring a railway e-ticket via a Browser/Server system generally encompasses the steps of Inquiry and Booking. In FIG. 2A when inquiring about a railway e-ticket a user 105 uses a browser to access at 210 the website of the railway e-ticket central application system on a central server and to input at 215 the parameters comprising at least origin and desired destination and date. The parameters are compiled by the central application system at 220 and a reply is sent to the user via the Internet at 225.

However, the Browser/Server system relies heavily on the central server as the browser has little application capability. Because of the uncontrollable nature of the entire Internet environment, the central server cannot provide guaranteed application performance and user experiences as the local server can in a Client/Server environment.

In FIG. 2B to book the ticket, the user 105 uses a browser to access at 210 the website and to submit the booking order information at 230. The central server processes the order at 235 and responds to the user at 240. If the booking is successful at 240, confirmation is sent to user at 245 and displayed in the website opened in the browser 210. If the ticket is not booked at 240, the user is informed at 250 whereupon the user may make another inquiry at 210 or exit the system.

Usually the Browser/Server system is not be used for the boarding control function given its non-predictable response time across the wide-area network, unless the server is located locally which then becomes similar to the multi-tier Client/Server technology.

Figure 3A:
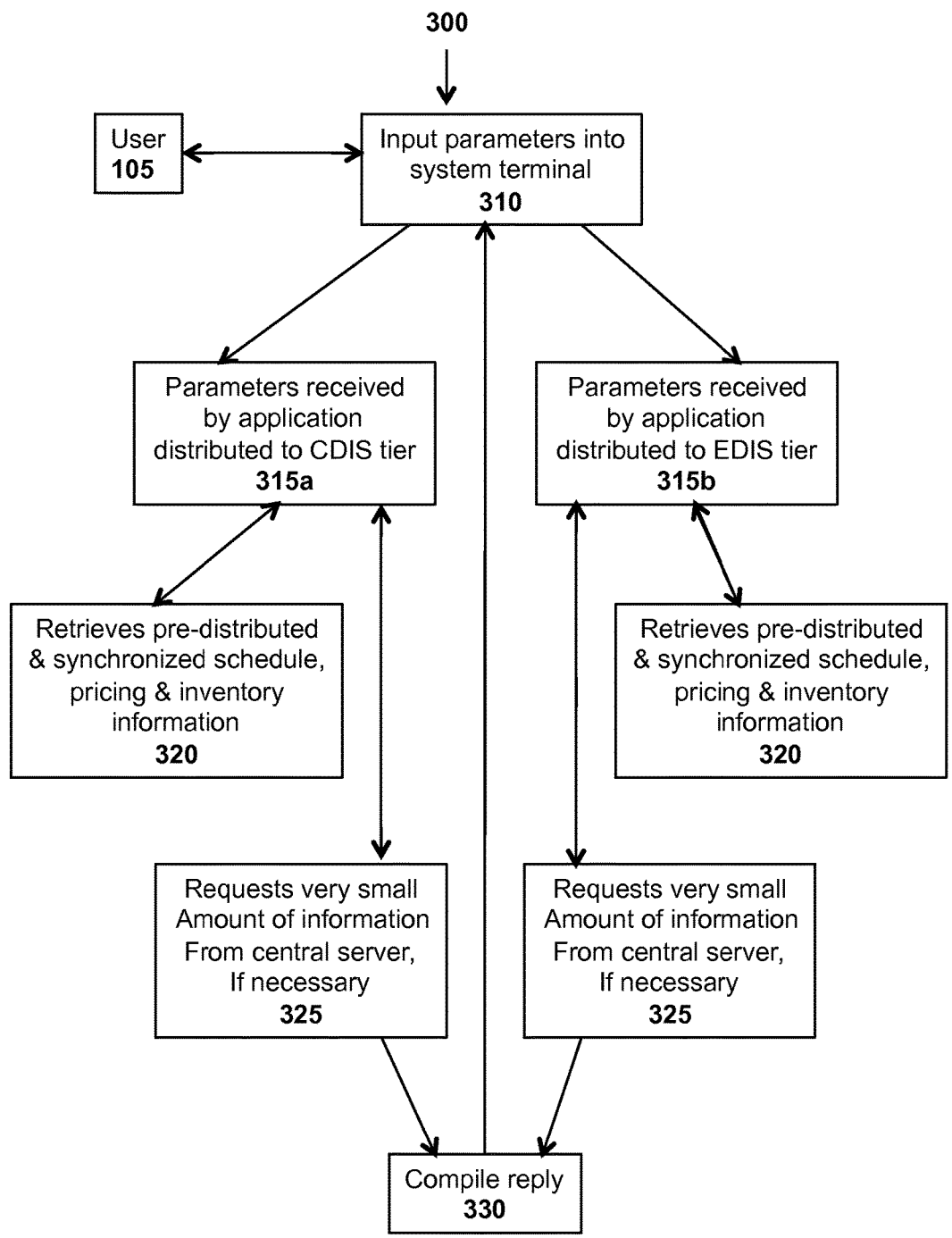
FIGS. 3A-3C are flowcharts illustrating the processes of inquiry (FIG. 3A), booking (FIG. 3B) and boarding with (FIG. 3C) a railway e-ticket via the Distributed Cloud Service system.
Figure 3B:
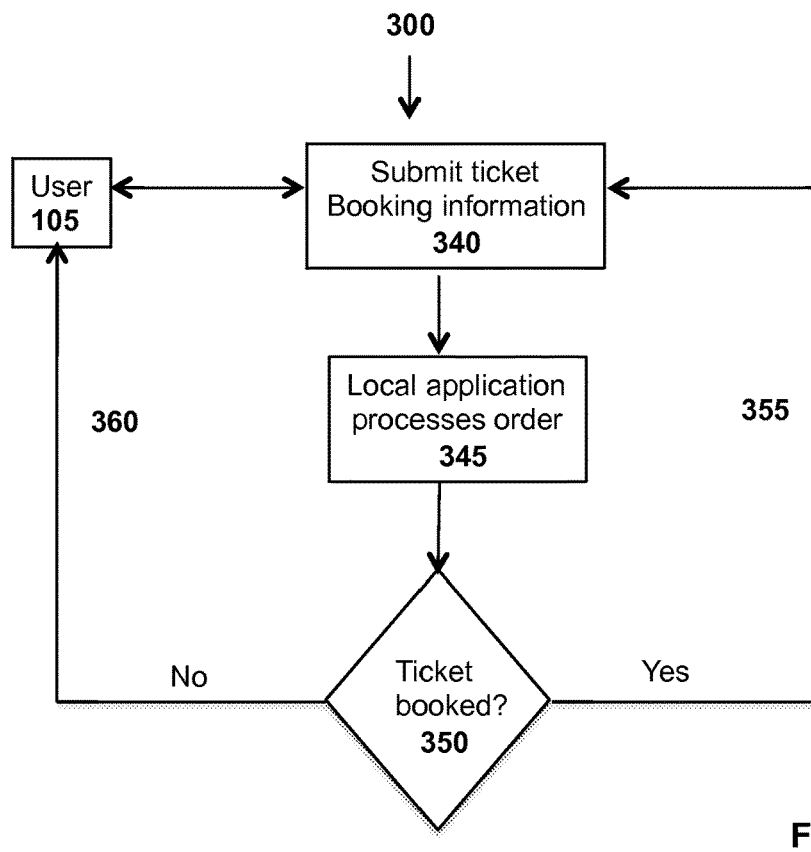
Figure 3C:
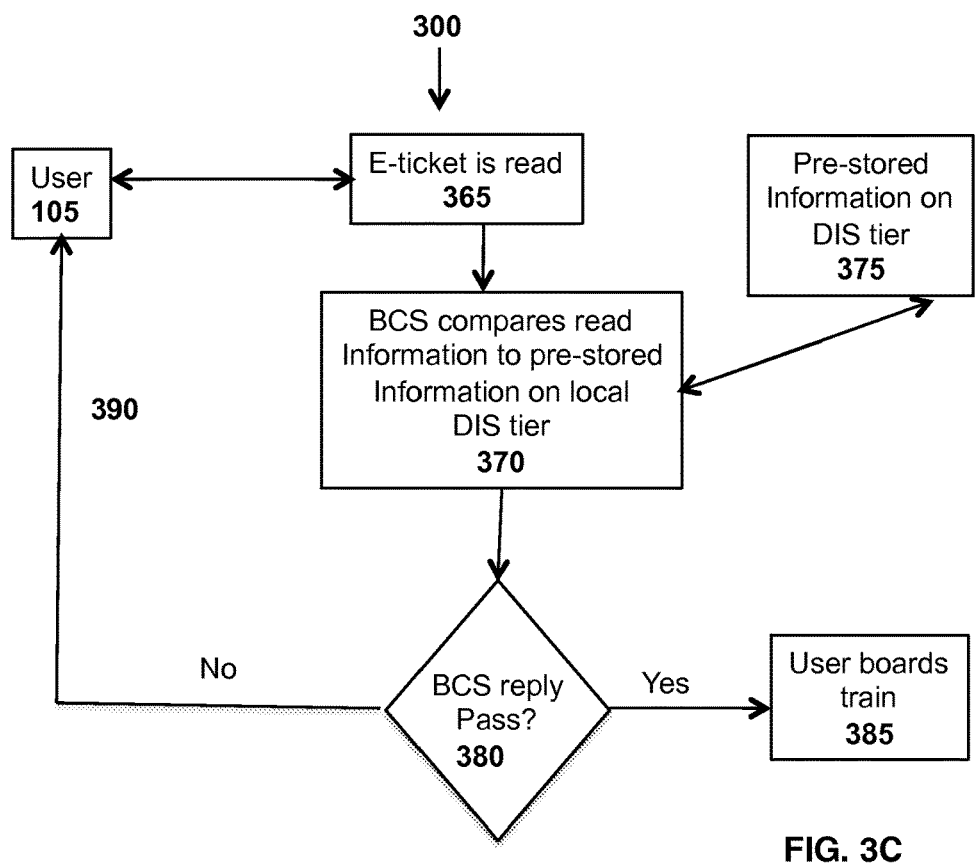

FIGS. 3A-3C depict the steps in a flowchart of acquiring a railway e-ticket via the Distributed Cloud Services system. The process 300 of acquiring and using a railway e-ticket generally encompasses the steps of Inquiry, Booking, and Boarding. In FIG. 3A when inquiring about a railway e-ticket a user 105 accesses the system terminal to input at least the origin, destination and date at 310. The application, distributed via the component distribution server/asset distribution server system of the Distributed Internet Services system at a client DIS (CDIS) tier or an edge DIS (EDIS) tier, which is at the same local area network as the system terminal, receives the parameters at 315a or 315b, respectively. and retrieves at 320 certain schedule, pricing and inventory information that are pre-distributed and synchronized as described with reference to the CDS/ADS system with the central cloud server. The application also requests, if necessary, at 325 a very small amount of information directly from the central server across the wide-area network. The local application compiles the reply at 330 and responds to the user at 335 by displaying on the system terminal 310 the information to book the ticket in real-time with guaranteed performance in most cases, unless the wide area network is completely unavailable.

The local DIS tier keeps the data that are synchronized with the central cloud server through the Distributed Cloud Services. Only under certain conditions, such as the requested train only has a few tickets available, will the local tier need to send requests directly to the central server with very small amount of data. The Distributed Cloud Services are usually fast even over the uncontrollable Internet environment), thus it is able to provide guaranteed response time and application performance, in most of cases.

In FIG. 3B to book the ticket, the user 105 submits the ticket booking information on the system terminal at 340. The local application processes the order at 345 and responds to the user at 350 in real-time in most cases since it only needs to send a very small amount of information directly to the central cloud server under certain conditions. If the booking is successful at 355, confirmation is displayed at the system terminal 340 and the booking information is stored on the DIS tier. If the ticket is not booked at 360, the user is informed whereupon the user may make another inquiry at 310 or exit the system. The booking order is based on system data that are synchronized with the central cloud server by the "Distributed Cloud Services". The application performance is guaranteed in most cases.

In FIG. 3C, for boarding the train the e-ticket is handed to a gate operator or machine read at 365. The ticket may comprise a magnetic strip, may be paper with a bar code or may be an RFID-based card or paper. The boarding control system receives the data encoded on the ticket at 370 and compares the same at 375 to that pre-stored on the local DIS tier. If the BCS system at 380 passes the ticket, the user boards the train at 385. If the BCS system cannot match the encoded ticket data with the pre-stored information, the ticket fails at 390 and the user cannot board the train. Since the ticket data is already pre-stored in the local DIS tier of the BCS system by the "Distributed Cloud Service", the response is real-time.

Figure 4:
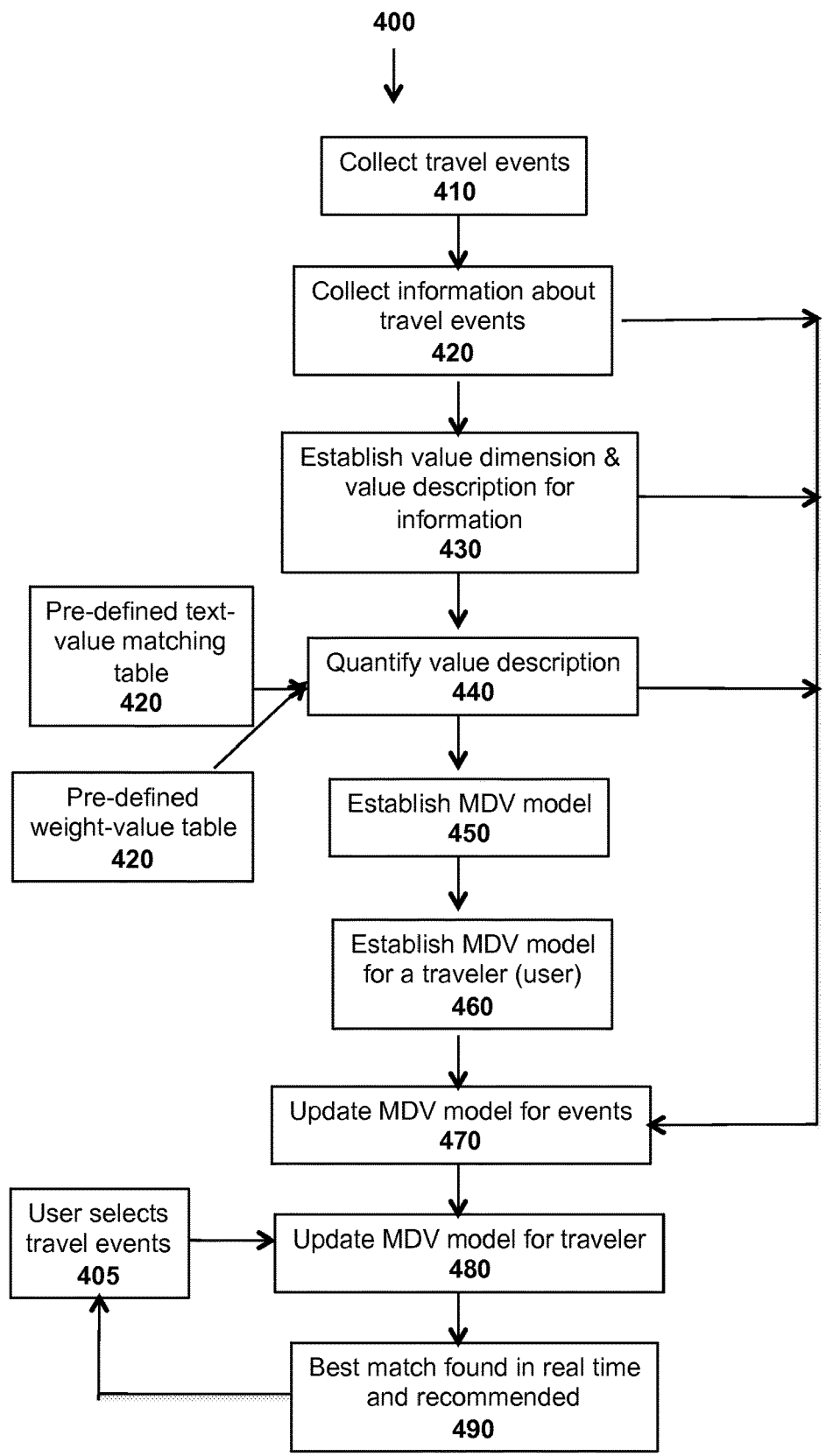
FIG. 4 is a flowchart to create a Multi-Dimensional Value model.

FIG. 4 depicts the steps in creating a multi-dimensional value model for a user.

At step 410 travel events are collected. For each region of traveling interests, first find all travel events as defined above from all possible sources, online and offline. The list of events can be augmented further later during the collect information step.

At step 420 information about travel events is collected. For each travel event, all possible related information from any and all sources is found. Collect the entire sentence and paragraphs related to an event. Put the all collection into a raw information library by events. If more events are found through this process, augment the event list, and repeat this step. The information about an event is categorized by the source as defined herein depending on from where it is collected.

At step 430 the value dimension and value description are established. Using a pre-defined dictionary, each entry of information of an event is analyzed to establish the initial set of value dimension of an event. The dictionary contains only words defined into "value dimension" and "value description". For example, an information entry collected about a hotel may be "the room is very clean, but the bed is just too hard for me". Here the "room" is found in the dictionary as a value dimension, therefore the "room" is extracted as a new dimension for the MDV model, if it was not defined previously, while "very" and "clean" are in the dictionary as "value description". Furthermore since "very clean" appears in the sentence as an adverb to further define the adjective, so "very clean" is extracted as the value description for the given value dimension "room". So from this information entry, "room" is extracted out as the "value dimension" with corresponding "very clean" as the "value description". Similarly, "bed" is extracted out as a "value dimension" with "too hard" as the "value description". The dictionary is continuously augmented manually whenever a new word is found that is not in the dictionary and is determined to be added into the dictionary.

An example of the multiple dimensional value model for a hotel with all value dimensions found (they may not be weighted equally) includes 1) Location
2) Room
3) Building style
4) Walkway
5) Lobby
6) Furniture in lobby
7) Bus
8) Taxi
9) $2^{nd}$ floor Italian restaurant
10) Gym
11) Swimming pool
12) Hot tub
13) Front desk
14) Room service
15) Suite
16) Bed
17) Pillow
18) Refrigerator
19) View from Suite
20) Bedding
21) Shoe shining
22) Breakfast
23) Conference room
24) Chef at seafood restaurant
25) Elevator
26) Room furniture style
27) Bike
28) Transportation to airport
29) Parking garage
30) Valet service
31) Shopping
32) Bring a pet
33) Promotional upgrade or price discount At step 440, the value description is quantified. At substep 442, a pre-defined text-value matching table is used to convert the text found for "value description" into a numeral value, such as converting "very clean" into "0.95" for the value dimension "room" and converting "too hard" into "0.5" for another value dimension "bed". At substep 444, a pre-defined weight-value table is used to add the weight for the information, both on the value dimension and value description. For instance, the above information entry is from the source of "Popular source" which has a weight of 0.9.

At step 450, an MVD model for an event is established and updated. Utilizing the results from steps 430 and 440, the MVD for the given event is established by multiplying the weight with the value for each value dimension, such as

...

Dimension="room": value=0.9*0.95=0.855
Dimension="bed": value=0.9*0.5=0.45

...

When more value descriptions are found for a value dimension, they are averaged with weight into one value. The dimensions of the MDV model for each category of events is defined as the largest dimensions of the MDV model found from the information available.

At step 460, an MVD model is established for a user (traveler). The initial model is set up where the MVD model for a traveler for each category of events is initially set as the same dimensions as the event model with the best value for each dimension. At each step of the selection process of the traveler from the initially recommended event, the value for the corresponding event of the traveler's model is modified based on his selection. After one or more selections showing the traveler's preference, the value for each dimension is set for this traveler's MDV model.

At step 470, the MDV model is updated for events. The system will constantly collect the information and update the MDV model for each event.

At step 480, the MDV model is updated for the traveler. Whenever the traveler requests event recommendation and selects or revises toward the recommended event, his MDV model is updated. Based on certain conditions, for instance the traveler's answer to certain questions, like "what's your purpose for the trip", the MDV model for this traveler can be labeled and stored to correspond that condition to, for example, "for business travel" or "for vacation travel". Other representative examples of conditions which may cause a different labeled model include, but are not limited to, "winter trip", "summer trip", "travel at age of 35", and "travel at age of 52", "with family" and "travel alone". The traveler's MDV model also can be updated with a condition of "Sequencing weight", such as, after a "Concert" event, his sequencing value for "BBQ restaurant" becomes much lower than that for "Seafood restaurant". A person's preferences can be complicated, therefore, the traveler's MDV model will develop more and more conditions as more feedback is collected from the traveler and more categories of his MDV model can be established. This can be limitless.

At step 490, the best match is found quickly in real time. With steps 410, 420, 430, 440, and 450 conducted constantly, the objective representation of each and all travel events becomes more and more complete and current. Whenever a traveler expresses certain wants, a travel event or a sequence of travel events can be quickly found and recommended to the traveler based on the degree of matching of the traveler's MDV model to the event(s)' models under given conditions. For instance, in the past under the given conditions, for a get-away weekend, for example, the traveler prefers a hotel with a nice Italian restaurant, at a historical place with easy access to the airport. In addition, the traveler usually, in his personal vacation, cares less about gym availability and likes to bring his dog. So the hotel events are searched based on the match to the values of this multiple value model and the best matching event is quickly recommended.

At step 500, if the user is satisfied with the match, s/he proceeds to book the hotel, airplane, etc. If the user is not satisfied, s/he can refine the search with more or different conditions at step 505.

Figure 5A:
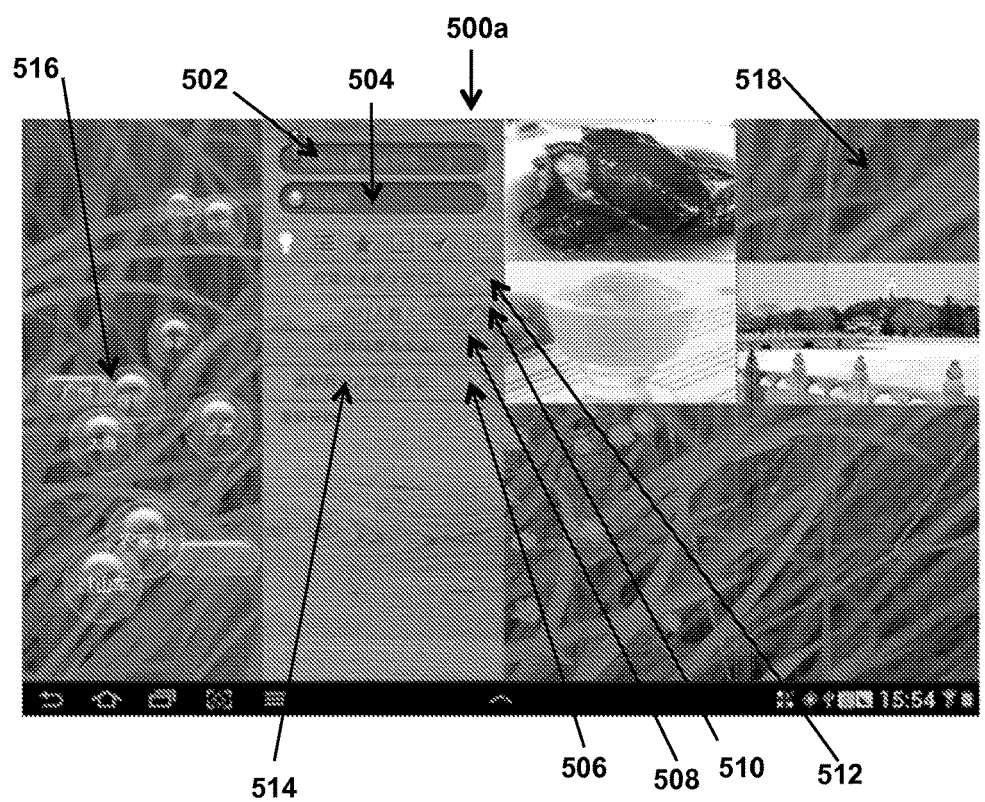
FIGS. 5A-5J are screenshots of webpages illustrating how the user can interact with MyTripServices.
Figure 5B:
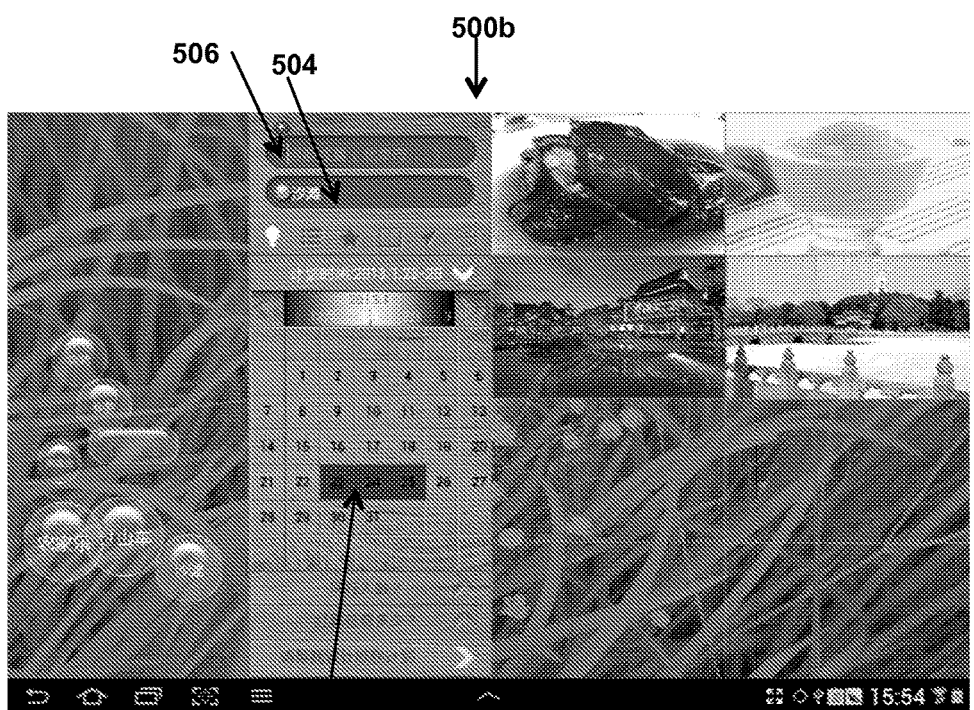

FIGS. 5A-5J are individual screen shots of webpages 500a-j illustrating features of the MyTripService personalized journey planning application that utilizes multidimensional value matching for a best recommendation for the user. FIG. 5A is a home page 500a showing various features. The interactive screen identifies the current location 502 and enables entry for where the user wants to travel at 504. The webpage also is configured for functions for entry/selection for "How long for the trip?" 506, "Number of people? 508, "Budget Plan" 510, "Help me to plan my trip" 512, and a "Start over again" 514. The page displays a plurality of animated bubbles, represented at 516, which constantly float from bottom to top and prompt the user with ideas for the trip, such as, but not limited to, Beach, BBQ, Camp, a particular city or place name. The size, moving speed, frequency of appearance, and/or position of a bubble is decided by its likelihood to be of interest for the user. The user may touch any bubble that matches an interest for the trip and may choose more than one bubble. The webpage also may display advertisements and promotions at 518. In FIG. 5B, the webpage 500b now shows that the user has selected the beach at 504 and selected the date for the planned trip at 506, which is displayed on a drop-down calendar at 520

Figure 5C:
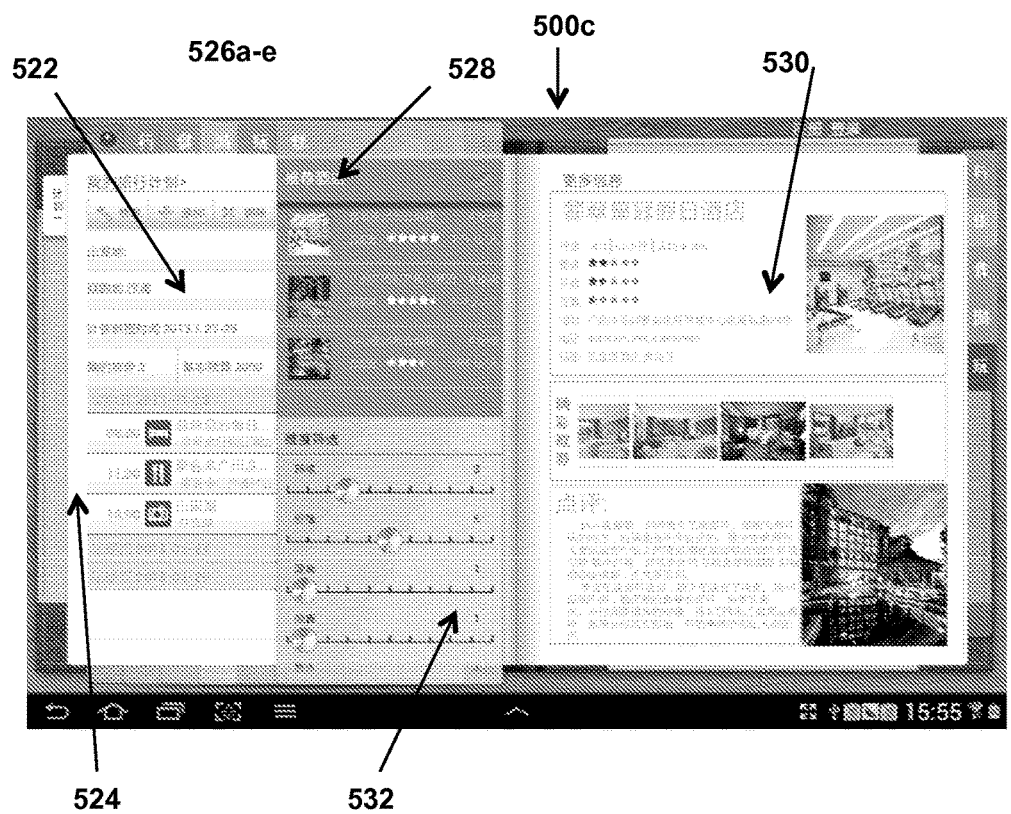

In FIG. 5C, the webpage 500c displays the best recommendation for the trip based on the trip parameters which are displayed at 522, i.e., including the beach, two people, a planned budget, etc. A recommended trip schedule is displayed at 524 and consists of the recommended "Travel Event". The page comprises five tabs, Transportation 526a, Eating 526b, Touring 526c, Playing or Entertainment 526d, and Lodging 526e. The Lodging tab is clicked and three hotels are recommended at 528 based the best match of the value matrices between the hotels and the traveler. The page also displays at 530 detailed information for one of the recommended hotels when the user chooses from the list at 526e. The user is also able to modify the major value dimensions at 532 by sliding the buttons across the scales to update or change the recommendation.

Figure 5D:
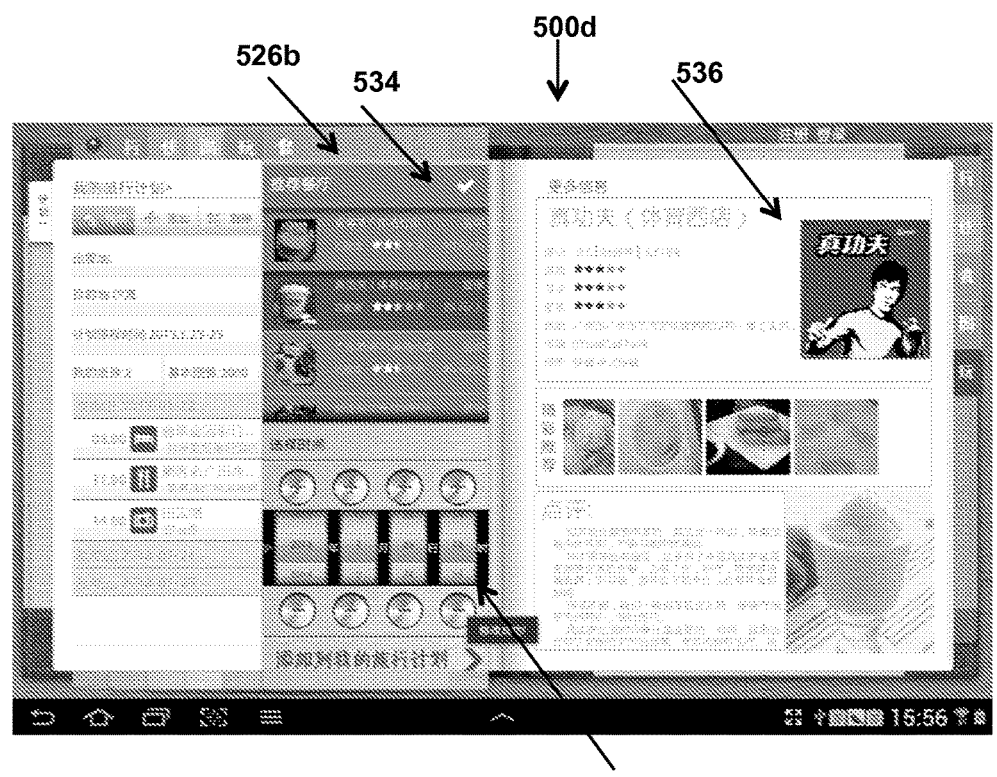

In FIG. 5D the tab Eating 526b is selected in the webpage 500d and three restaurants are recommended at 534 based on the best match of the value matrices between the traveler and the restaurants. Detailed information about one of the restaurants is displayed at 536. In the drop-down for tab 526b, the reservation time is selected at 538. As with Lodging, the user may modify the selection.

Figure 5E:
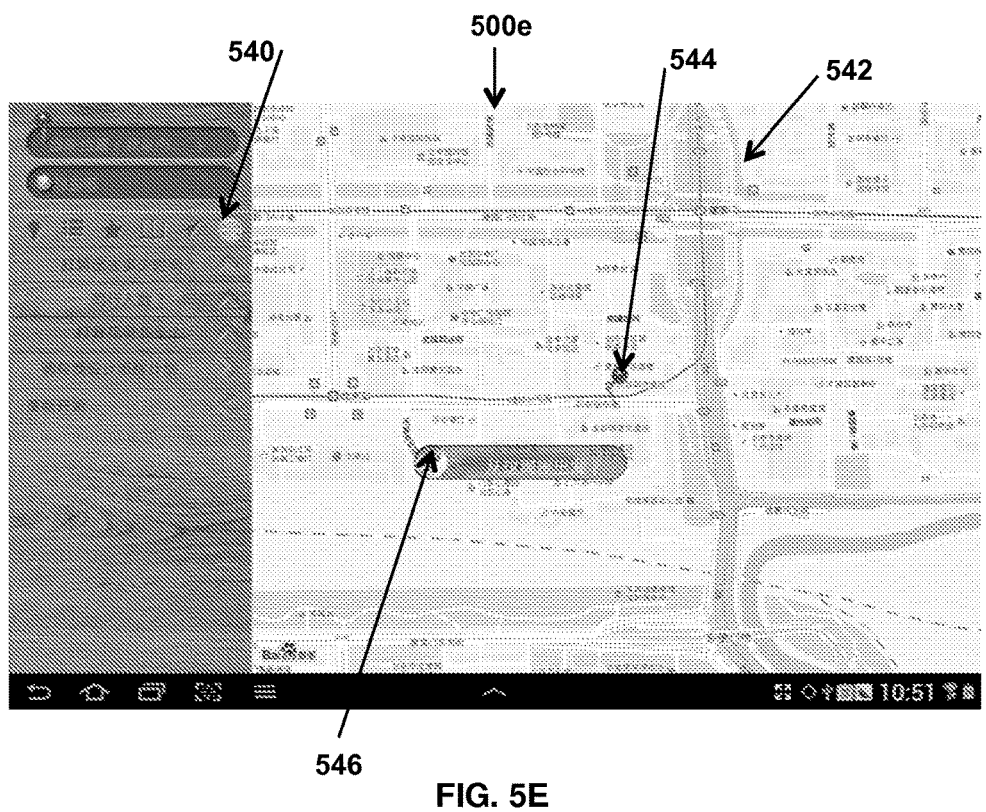

In FIG. 5E, the webpage 500e shows that icon 540 is selected so that the user may enter a detailed transportation plan on the displayed map 542. The starting place 544 is selected by touching the desired location in the map, for example, Beijing city. The map may be scaled from the whole nation to a detailed street, within 3 selections, i.e., city, district, and street. The button 546, when selected, confirms the starting place.

Figure 5F:
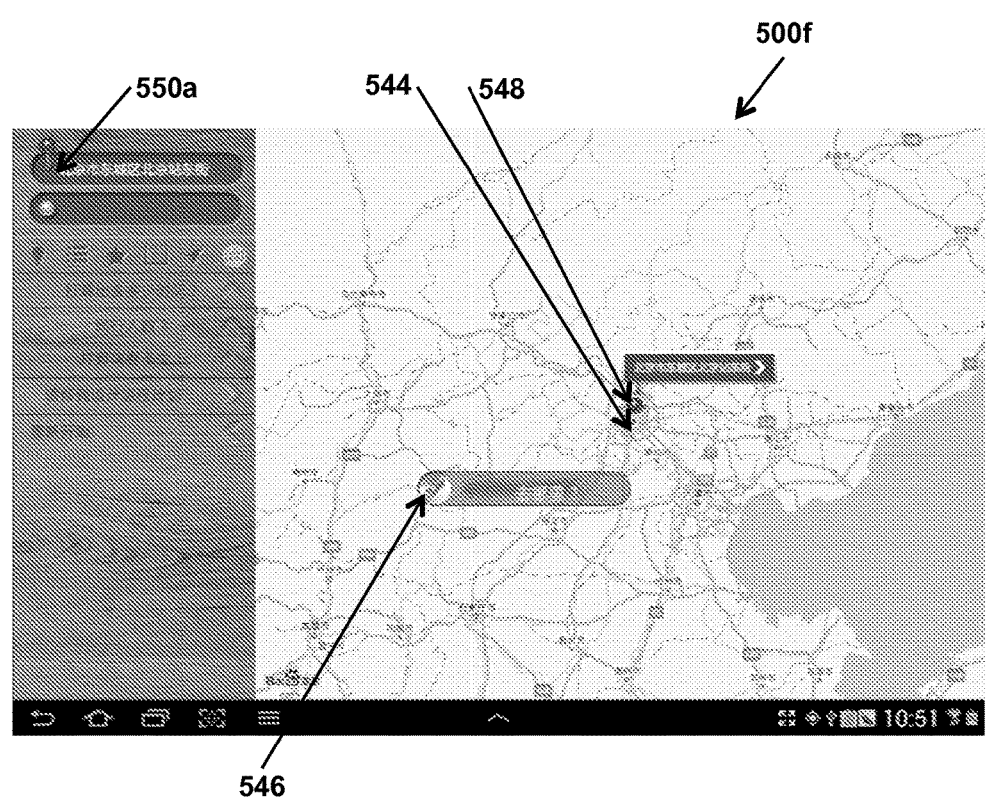
Figure 5G:
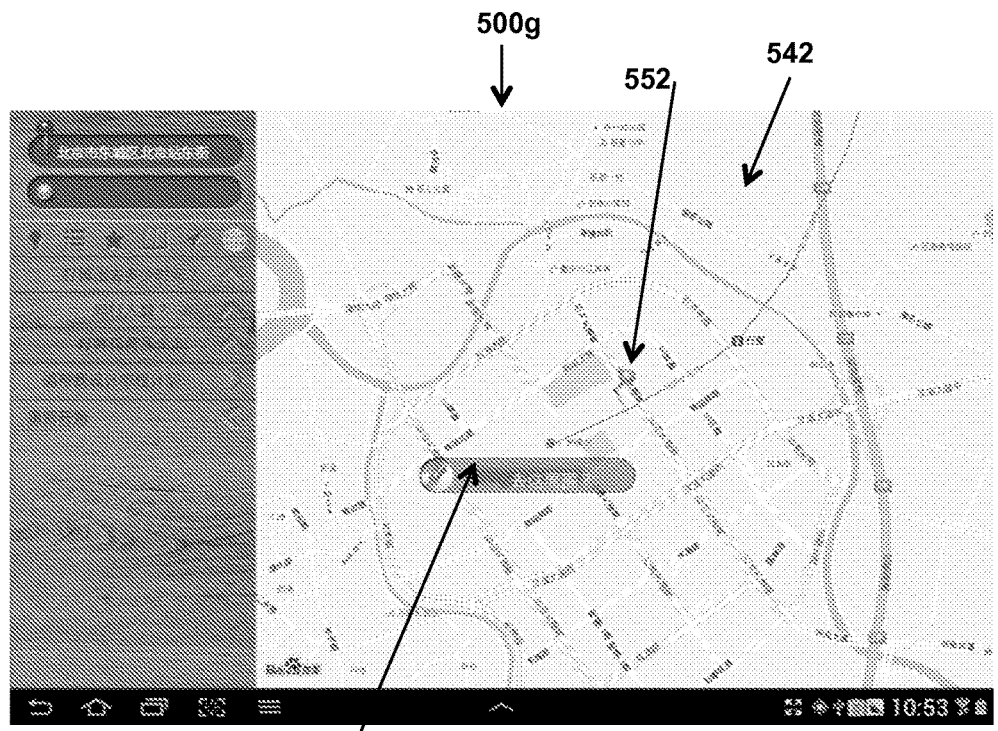
Figure 5H:
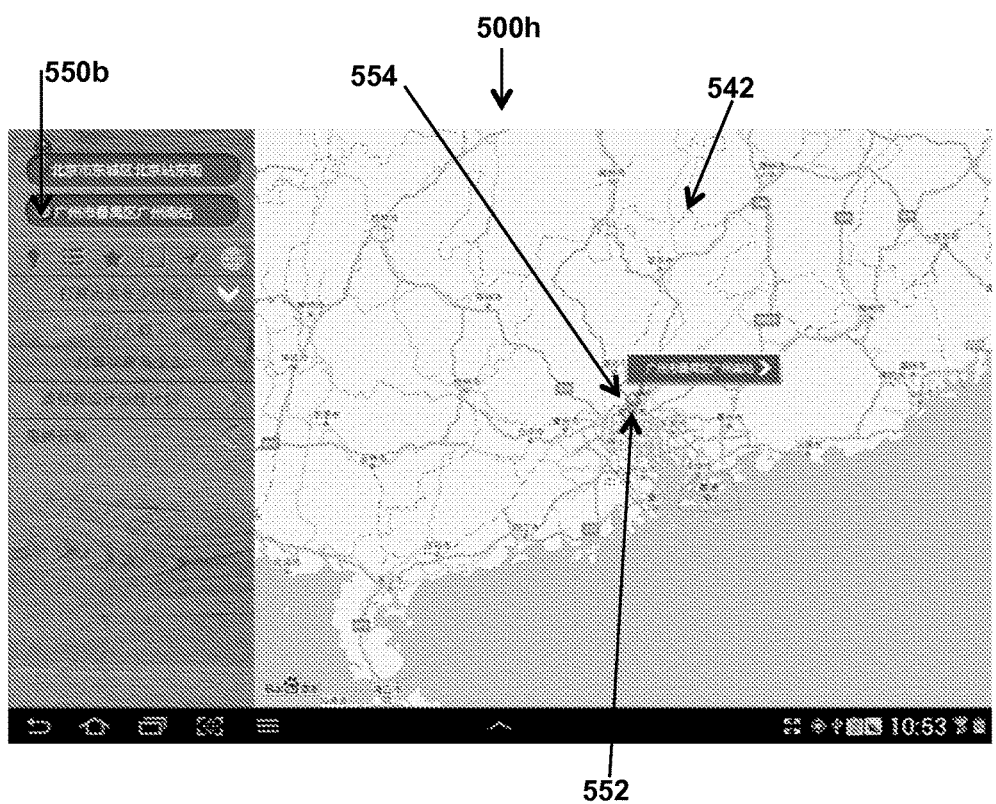
Figure 5I:
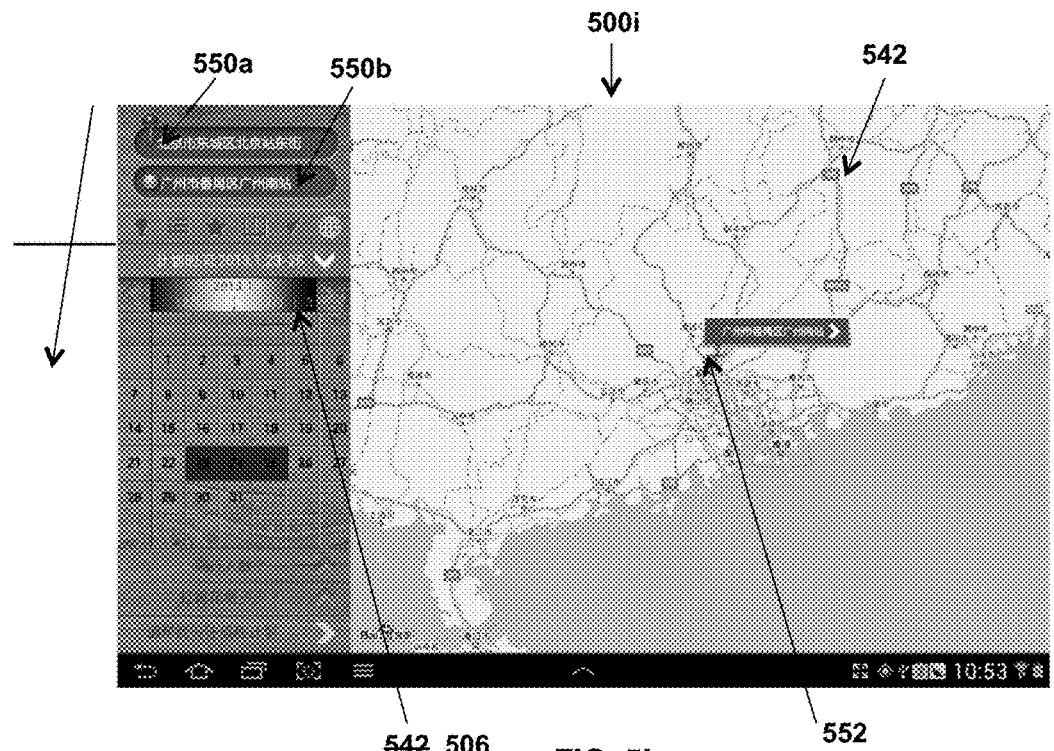

In FIG. 5F, on webpage 500f once the starting place 544 is confirmed at 546, the closet street address 548 is obtained from the map database 550a. In FIG. 5G, on webpage 500g the destination 552 is selected on the map 542 and confirmed at button 546. In FIG. 5H, on webpage 500h once the destination 552 is confirmed at 546, the address 554 is obtained from the map database 550b. In FIG. 5I, the webpage 500i shows the destination 552 on the map 542 and the starting location address and destination address at 550a and 550b, respectively. The trip dates are shown in the drop-down at 506.

Figure 5J:
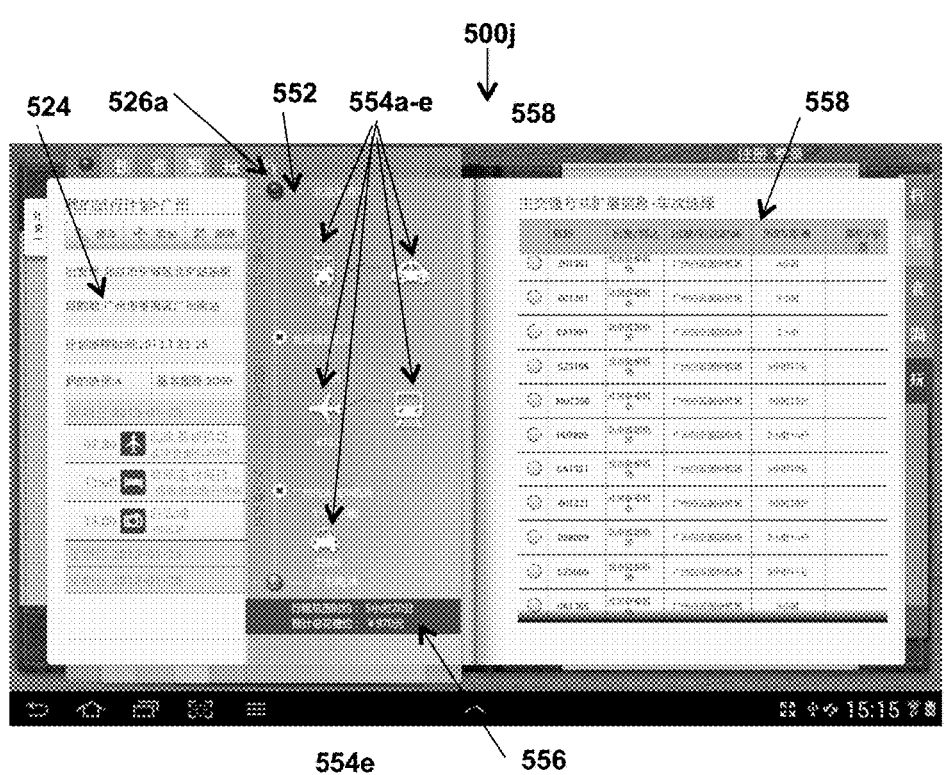

In FIG. 5J on webpage on webpage 500j the tab Transportation 526a is selected and transportation plans are recommended. A door-to-door transportation plan at 552 can be selected such that recommendations are made for such modes as public transportation, by car, by airplane, by railway, from the stating place to the destination, including time and cost. For example, the user can obtain the time and cost to the airport from the starting location via public transportation and from the airport to the destination. In this latter instance, a taxi may be the only recommendation to travel from the airport to the destination. The total time and cost for the selected transportation plan is displayed at 556.

Detailed information is displayed at 558 for selected recommended major modes of transportation. The recommended trip schedule 524, including starting location and destination, also is displayed.

Data Structure Design Documentation for Multidimensional Value Model

The following Tables describe the MDV model.

I. Event Value Tables

TABLE Ia

| Event Value Table Introduction | |
|---|---|
| Name | Event Value table |
| Code | MTS_INCIDENT_VALUE |
| Database Management Systems | IBM DB2 |

TABLE Ib

SQL Statement Event Related Value Table

```
alter table MTS_INCIDENT_VALUE
    drop foreign key "F_Refere";
alter table MTS_INCIDENT_VALUE
    drop foreign key "F_Refere";
drop table MTS_INCIDENT_VALUE;
======================================================
-- Table: MTS_INCIDENT_VALUE
======================================================
create table MTS_INCIDENT_VALUE (
    "v_id"               BIGINT      not null,
    "v_incident_id"      BIGINT,
    "v_dimensions_id"    INT,
    "v_dimensions_value" FLOAT(2,2),
    "v_create_time"      DATE,
    "v_update_time"      DATE,
    constraint "P_Key_1" primary key ("v_id")
);
``` comment on table MTS_INCIDENT_VALUE is;

Event Value Table—an event corresponding to the multiple dimensions alter table MTS_ INCIDENT_VALUE add constraint "F_Refere" foreign key ("v_incident_id")

references MTS_INCIDENT ("i_id")

on delete restrict;

alter table MTS_INCIDENT_VALUE add constraint "F_Refere" foreign key ("v_dimensions_id")

references MTS_SYSTEM_DIMENSIONS ("d_id")

on delete restrict;

TABLE Ic

| Field Events Associated Value Table | |
|---|---|
| Name | Code |
| ID Primary Key ID | v_id |
| id Event ID | v_incident_id |
| id Dimensions ID | v_dimensions_id |
| Dimension values | v_dimensions_value |
| Created | v_create_time |
| Modified | v_update_time |

II. Event Matching Operation Flow Chart

TABLE IIa

| Event Matching Operation Chart Introduction | |
|---|---|
| Name | Event matching operation flow chart |
| Code | MTS_SYSTEM_INCIDENT_METCH_PROCESS |
| Database Management Systems | IBM DB2 Version 9.x for z/OS |

TABLE IIb

Event Matches the Relevant Operating Procedures Table Sql Statement

```
drop table MTS_SYSTEM_INCIDENT_METCH_PROCESS;
======================================================
-- Table: MTS_SYSTEM_INCIDENT_METCH_PROCESS
======================================================
create table MTS_SYSTEM_INCIDENT_METCH_PROCESS (
    "p_id"         INT         not null,
    "p_process_id" INT,
    "p_name"       VARCHAR(32),
    constraint "P_Key_1" primary key ("p_id")
);
``` comment on table MTS_SYSTEM_INCIDENT_METCH_PROCESS is:

'Event matching operation flow chart—fixed process for each step are numbered for recording user matching process

TABLE IIc

| Event Matching Operation Flow Chart of the Relevant Field | |
|---|---|
| Name | Code |
| ID Primary key ID | p_id |
| id Process ID | p_process_id |

III. Event Information Tables

TABLE IIIa

| Introduction to Basic Information Table Event | |
|---|---|
| Name | Event matching operation flow chart |
| Code | MTS_SYSTEM_INCIDENT_METCH_PROCESS |
| Database Management Systems | IBM DB2 Version 9.x for z/OS |

TABLE IIIb

Basic Information Related SQL Statement Event Table

```
alter table MTS_INCIDENT_INFO
    drop foreign key "F_Refere";
drop table MTS_INCIDENT_INFO;
======================================================
-- Table: MTS_INCIDENT_INFO
======================================================
create table MTS_INCIDENT_INFO (
    "i_id"         BIGINT       not null,
    "i_incident_id" BIGINT,
    "i_name"       VARCHAR(16),
```

TABLE IIIb-continued

Basic Information Related SQL Statement Event Table

```
    "i_value"     VARCHAR(21812),
    "i_desc"      VARCHAR(128),
    constraint "P_Key_1" primary key ("i_id")
);
``` comment on table MTS_INCIDENT_INFO is

Event Information Table—needed to classify the different events in different fields, using key-value form alter table MTS_INCIDENT_INFO
   add constraint "F_Refere" foreign key ("i_incident_id")
     references MTS_INCIDENT ("i_id")
     on delete restrict;

TABLE IIIc

Event-Related Fields of Basic Information Table

| Name | Code |
|---|---|
| ID Primary key ID | I_id |
| ID (FK) Event ID (FK) | I_incident_id |
| Field Name | I_name |
| Field Value | I_value |
| Field Description | I_desc |

IV. Value Model in Table Format

TABLE IVa

Value Model Format Tables Introduction

| Name | Value model in table format |
|---|---|
| Code | MTS_SYSTEM_MODLE_FORMAT |
| Database Management Systems | IBM DB2 Version 9.x for z/OS |

TABLE IVb

SQL Statement Related Value Model in Table Format

```
drop table MTS_SYSTEM_MODLE_FORMAT;
=====================================================
-- Table: MTS_SYSTEM_MODLE_FORMAT
-=====================================================
create table MTS_SYSTEM_MODLE_FORMAT (
    "f_id"           INT         not null,
    "f_format"       INT,
    "f_name"         VARCHAR(32),
    "f_state"        INT,
    "f_create_time"  DATE,
    "f_update_time"  DATE,
    constraint "P_Key_1" primary key ("f_id")
);
``` comment on table MTS_SYSTEM_MODULE_FORMAT is: 'value model display format table'

TABLE IVc

Related Field Value Model in Table Format

| Name | Code |
|---|---|
| ID Primary key ID | f_id |
| Display Format | f_format |
| Format Name | f_name |

TABLE IVc-continued

Related Field Value Model in Table Format

| Name | Code |
|---|---|
| Status | f_state |
| Created | f_create_time |
| Update | F_update_time |

V. Value Matrix Keyword Table

TABLE Va

Introduction to the Keyword Table Value

| Name | Value matrix keyword table |
|---|---|
| Code | MTS_SYSTEM_KEYWORD |
| Database Management Systems | IBM DB2 Version 9.x for z/OS |

TABLE Vb

SQL Statement Related Keyword Value Matrix Table

```
alter table MTS_SYSTEM_KEYWORD
    drop foreign key F_MTS_FK;
drop table MTS_SYSTEM_KEYWORD;
=====================================================
-- Table: MTS_SYSTEM_KEYWORD
-=====================================================
create table MTS_SYSTEM_KEYWORD (
    "k_id"            INT         not null,
    "k_keyword"       VARCHAR(64),
    "k_weight"        FLOAT(1,2),
    "k_flag"          INT,
    "k_dimensions_id" INT,
    "k_create_time"   DATE,
    "k_update_time"   DATE,
    constraint "P_Key_1" primary key ("k_id")
);
``` comment on table MTS_SYSTEM_KEYWORD is 'Value matrix system-level keyword table';

alter table MTS_SYSTEM_KEYWORD
   add constraint F_MTS_FK foreign key ("k_dimensions_id")
     references MTS_SYSTEM_DIMENSIONS ("d_id")
     on delete restrict;

TABLE Vc

Related Field Value Matrix Keyword Table

| Name | Code |
|---|---|
| ID Primary key ID | k_id |
| Value keyword | k_keyword |
| Weights | k_weight |
| Identify positive and negative | k_flag |
| ID Belongs dimension ID | k_dimensions_id |
| Created | k_create_time |
| Update | k_update_time |

VI. Value Dimension Table

TABLE VIa

| Value Dimension Table Introduction | |
|---|---|
| Name | Value dimension table |
| Code | MTS_SYSTEM_KEYWORD |
| Database Management Systems | IBM DB2 Version 9.x for z/OS |

TABLE VIb

Related to the Value of the Dimension Table SQL Statement

```
alter table MTS_INCIDENT_VALUE
    drop foreign key "F_Refere";
alter table MTS_SYSTEM_DIMENSIONS
    drop foreign key F_MTS_FK;
alter table MTS_SYSTEM_KEYWORD
    drop foreign key F_MTS_FK;
alter table MTS_USER_RESULT
    drop foreign key "F_Refere";
drop table MTS_SYSTEM_DIMENSIONS;
================================================
-- Table: MTS_SYSTEM_DIMENSIONS
================================================
create table MTS_SYSTEM_DIMENSIONS (
    "d_id"           INT       not null,
    "d_name"         VARCHAR(16),
    "d_parent_id"    int,
    "d_weight"       FLOAT(2,2),
    "d_incident_type" INT,
    "d_create_time"  DATE,
    "d_update_time"  DATE,
    constraint "P_Key_1" primary key ("d_id")
);

comment on table MTS_SYSTEM_DIMENSIONS is:
'Value system-level dimension table';
alter table MTS_SYSTEM_DIMENSIONS
    add constraint F_MTS_FK foreign key ("d_incident_type")
    references    MTS_SYSTEM_INCIDENT_TYPE
        ("t_id")
    on delete restrict;
```

TABLE VIc

Related Field Value Dimension Table

| Name | Code |
|---|---|
| Primary key ID | d_id |
| Dimension Name | d_name |
| Parent Dimension | d_parent_id |
| Weights (alternate) | d_weight |
| An event type | d_incident_type |
| Created | d_create_time |
| Update | d_update_time |

VII. Dictionary Maintenance Record Form

TABLE VIIa

| About Dictionary Maintenance Record Form | |
|---|---|
| Name | Dictionary maintenance record form |
| Code | MTS_SYSTEM_DICTIONARY_RECORD |
| Database Management Systems | IBM DB2 Version 9.x for z/OS |

TABLE VIIb

Maintenance of Records Related to the Dictionary Table SQL Statement

```
alter table MTS_SYSTEM_DICTIONARY_RECORD
    drop foreign key "F_Refere";
drop table MTS_SYSTEM_DICTIONARY_RECORD;
================================================
-- Table: MTS_SYSTEM_DICTIONARY_RECORD
================================================
create table MTS_SYSTEM_DICTIONARY_RECORD (
    "r_id"           INT       not null,
    "r_incident_id"  INT,
    "r_version"      VARCHAR(5),
    "r_creat_time"   DATE,
    "r_update_time"  DATE,
    "r_user"         INT,
    "r_info"         VARCHAR(256),
    constraint "P_Key_1" primary key ("r_id")
);

comment on table MTS_SYSTEM_DICTIONARY_RE-
CORD is 'Dictionary Maintenance Record Form'
alter table MTS_SYSTEM_DICTIONARY_RECORD
    add constraint "F_Refere" foreign key ("r_incident_id")
    references    MTS_SYSTEM_INCIDENT_TYPE
        ("t_id")
    on delete restrict;
```

TABLE VIIc

Dictionary table maintenance records relevant fields

| Name | Code |
|---|---|
| Primary key ID | r_id |
| An event type | r_incident_id |
| Version number | r_version |
| Creation date | r_create_time |
| Modified | r_update_time |
| Operating account | r_user |
| Operating information | r_info |

VIII. Recommended Tag Table

TABLE VIIIa

| Recommended Label Table Introduction | |
|---|---|
| Name | Recommended tag table |
| Code | MTS_INCIDENT_RECOMMENDED LABEL |
| Database Management Systems | IBM DB2 Version 9.x for z/OS |

TABLE VIIIb

Related SQL statement recommended label sheet

```
alter table MTS_USER_RECOMMEND
    drop foreign key "F_Refere";
drop table MTS_INCIDENT_RECOMMEND_LABEL;
================================================
-- Table: MTS_INCIDENT_RECOMMEND_LABEL
================================================
create table MTS_INCIDENT_RECOMMEND_LABEL (
    "l_id"           INT       not null,
    "l_name"         VARCHAR(32),
    "l_state"        INT,
    "l_relation"     VARCHAR(256),
    "l_synonymous"   VARCHAR(256),
    constraint "P_Key_1" primary key ("l_id")
);
``` comment on table MTS_INCIDENT_RECOMMEND_LABEL is 'Recommended label table-relationship between events—by searching, event log table maintenance operation';

TABLE VIIIc

Related Fields Recommended Label Sheet

| Name | Code |
|---|---|
| Primary key ID | I_id |
| Label name | I_name |
| Label state | I_state |
| Related tags | I_relation |
| Synonymous tag | I_synonymous |

IX. Search Record Form

TABLE IXa

Search Record Sheet Introduction

| Name | Search record form |
|---|---|
| Code | MTS_INCIDENT_SEARCH |
| Database Management Systems | IBM DB2 Version 9.x for z/OS |

TABLE IXb

SQL Statement to Search Records Related Table

```
drop table MTS_INCIDENT_SEARCH;
--=======================================================
-- Table: MTS_INCIDENT_SEARCH
--=======================================================
create table MTS_INCIDENT_SEARCH (
    "s_id"        INT        not null,
    "s_keyword"   VARCHAR(32),
    "s_time"      DATE,
    "s_user_id"   INT,
    "s_state"     INT,
    constraint "P_Key_1" primary key ("s_id")
);
``` comment on table MTS_INCIDENT_SEARCH is 'Search record form—for statistical and user recommendations';

TABLE IXc

Search Records Related Fields Table

| Name | Code |
|---|---|
| Primary key ID | s_id |
| Search keyword | s_keyword |
| Time | s_time |
| User | s_user_id |
| Status | s_state |

X. Travel Event Type

TABLE Xa

Travel Event Type Description

| Name | Travel event type |
|---|---|
| Code | MTS_SYSTEM_INCIDENT_TYPE |
| Database Management Systems | IBM DB2 Version 9.x for z/OS |

TABLE Xb

Travel-Related Event Type SQL Statement

```
alter table MTS_INCIDENT
    drop foreign key "F_Refere";
alter table MTS_SYSTEM_DICTIONARY_RECORD
    drop foreign key "F_Refere";
alter table MTS_SYSTEM_DIMENSIONS
    drop foreign key F_MTS_FK;
alter table MTS_USER_RESULT
    drop foreign key "F_Refere";
alter table USER_MATCH_RECORD
    drop foreign key "F_Refere";
drop table MTS_SYSTEM_INCIDENT_TYPE;
--=======================================================
-- Table: MTS_SYSTEM_INCIDENT_TYPE
--=======================================================
create table MTS_SYSTEM_INCIDENT_TYPE (
    "t_id"          INT        not null,
    "t_name"        VARCHAR(32),
    "t_parent_id"   INT,
    "t_create_time" DATE,
    "t_update_time" DATE,
    constraint "P_Key_1" primary key ("t_id")
);
``` comment on table MTS_SYSTEM_INCIDENT_TYPE is 'Travel system-level event type table';

TABLE Xc

Type of Event-Related Field Trip

| Name | Code |
|---|---|
| Primary key ID | t_id |
| Type name | t_name |
| Parent ID | t_parent_id |
| Created | t_create_time |
| Modified | t_update_time |

XI. Travel Event Table

TABLE XIa

Travel Event Table Introduction

| Name | Travel event table |
|---|---|
| Code | MTS_INCIDENT |
| Database Management Systems | IBM DB2 Version 9.x for z/OS |

TABLE XIb

Travel-Related Event Table SQL Statement

```
alter table MTS_INCIDENT
    drop foreign key "F_Refere";
alter table MTS_INCIDENT_INFO
    drop foreign key "F_Refere";
alter table MTS_INCIDENT_VALUE
    drop foreign key "F_Refere";
alter table MTS_USER_OPERATION_INCIDENT
    drop foreign key "F_Refere";
drop table MTS_INCIDENT;
--=======================================================
-- Table: MTS_INCIDENT
--=======================================================
create table MTS_INCIDENT (
    "i_id"        BIGINT     not null,
    "i_name"      VARCHAR(128),
    "i_area"      VARCHAR(16),
    "i_type_id"   INT,
    "i_state"     INT,
    "i_format_id" INT,
```

TABLE XIb-continued

Travel-Related Event Table SQL Statement

```
  "i_label"       VARCHAR(256),
  "i_create_time"    DATE,
  "i_update_time"    DATE,
  constraint "P_Key_1" primary key ("i_id")
);
``` comment on table MTS_INCIDENT is 'Travel event table';
alter table MTS_INCIDENT
   add constraint "F_Refere" foreign key ("i_type_id")
     references   MTS_SYSTEM_INCIDENT_TYPE ("t_id")
   on delete restrict;

TABLE XIc

Related Field Trip Event Table

| Name | Code |
| --- | --- |
| Primary key ID | i_id |
| Event name | i_name |
| District | i_area |
| Their type id | i_type_id |
| Event status | i_state |
| Display format (pending) | i_format_id |
| Events tab | i_label |
| Created | i_create_time |
| Update | i_update_time |

XII. User History Table Values Results

TABLE XIIa

User Profiles Values Result History

| Name | User history tables values results |
| --- | --- |
| Code | MTS_USER_RESULT_HISTORY |
| Database Management Systems | IBM DB2 Version 9.x for z/OS |

TABLE XIIb

SQL Statement Related to the Results of the User History Table of Values

```
drop table MTS_USER_RESULT_HOSTORY;
--=======================================================
-- Table: MTS_USER_RESULT_HOSTORY
--=======================================================
create table MTS_USER_RESULT_HOSTORY (
"r_id"       INT    not null,
"r_user_id"    INT,
"r_incident_id"  INT,
"r_influence_id" INT,
"r_dimensions_id" INT,
"r_dimensions_value" FLOAT(2,2),
"r_create_time"  DATE,
"r_update_time"  DATE,
constraint "P_Key_1" primary key ("r_id")
);
``` comment on table MTS_USER_RESULT_HOSTORY is 'User table values result history—the history of recording changes in user orientation';

TABLE XIIc

Related Fields User History Table of Values Results

| Name | Code |
| --- | --- |
| Primary key ID | r_id |
| User ID | r_user_id |
| Event type ID | r_incident_id |
| Impact parameter ID | r_influence_id |
| Dimensions ID | r_dimensions_id |
| Dimension values | r_dimensions_value |

XIII. Users Value Orientation Results Table

TABLE XIIIa

User Profile Values Result Table

| Name | Users value orientation results table |
| --- | --- |
| Code | MTS_USER_RESULT |
| Database Management Systems | IBM DB2 Version 9.x for z/OS |

TABLE XIIIb

Sql statement related to the results of a user table values

```
alter table MTS_USER_RESULT
    drop foreign key "F_Refere";
alter table MTS_USER_RESULT
    drop foreign key "F_Refere";
alter table MTS_USER_RESULT
    drop foreign key "F_Refere";
drop table MTS_USER_RESULT;
--=======================================================
-- Table: MTS_USER_RESULT
--=======================================================
create table MTS_USER_RESULT (
    "r_id"       INT    not null,
    "r_user_id"    INT,
    "r_incident_id"  INT,
    "r_influence_id" INT,
    "r_dimensions_id" INT,
    "r_dimensions_value" FLOAT(2,2),
    "r_create_time"  DATE,
    "r_update_time"  DATE,
    constraint "P_Key_1" primary key ("r_id")
);
``` comment on table MTS_USER_RESULT is 'User Values Results Table';
alter table MTS_USER_RESULT
   add constraint "F_Refere" foreign key ("r_influence_id")
     references MTS_USER_INFLUENCE ("i_id")
   on delete restrict;
alter table MTS_USER_RESULT
   add constraint "F_Refere" foreign key ("r_incident_id")
     references   MTS_SYSTEM_INCIDENT_TYPE ("t_id")
   on delete restrict;
alter table MTS_USER_RESULT
   add constraint "F_Refere" foreign key ("r_dimensions_id")
     references MTS_SYSTEM_DIMENSIONS ("d_id")
   on delete restrict;

TABLE XIIIc

Users Related Field Values Result Table

| Name | Code |
|---|---|
| Primary key ID | r_id |
| User id | r_user_id |
| Event type id | r_incident_id |
| Influencing parameter id | r_influence_id |
| Dimensions | r_dimensions_id |
| Dimension values | r_dimensions_value |
| Created | r_create_time |
| Update | r_update_time |

XIV. Users Value the Impact Parameter Table

TABLE XIVa

Users Value the Impact Parameter Table Introduction

| Name | Users value the impact parameter table |
|---|---|
| Code | MTS_USER_INFLUENCE |
| Database Management Systems | IBM DB2 Version 9.x for z/OS |

TABLE XIVb

SQL Statement Impact Related To Customer Value Parameter Table

```
alter table MTS_USER_RESULT
    drop foreign key "F_Refere";
drop table MTS_USER_INFLUENCE;
========================================================
-- Table: MTS_USER_INFLUENCE
========================================================
create table MTS_USER_INFLUENCE (
    "i_id"          INT         not null,
    "i_factor"      VARCHAR(16),
    "i_state"       INT,
    "i_create_time" DATE,
    "i_update_time" DATE,
    constraint "P_Key_1" primary key ("i_id")
);
``` comment on table MTS_USER_INFLUENCE is 'Users value the impact parameter table'

TABLE XIVc

Users Value The Impact Parameter Tables Related Fields

| Name | Code |
|---|---|
| Primary key ID | i_id |
| Influencing parameters | i_factor |
| Status | i_state |
| Created | i_create_time |
| Update | i_update_time |

XV. Users Matching Process Record Sheet

TABLE XVa

Users Matching Process Record Sheet Introduction

| Name | User recommendation form |
|---|---|
| Code | USER_MATCH_RECORD |
| Database Management Systems | IBM DB2 Version 9.x for z/OS |

TABLE XVb

SQL Statement Related Records User Table Matching Process

```
alter table USER_MATCH_RECORD
    drop foreign key "F_Refere";
drop table USER_MATCH_RECORD;
========================================================
-- Table: USER_MATCH_RECORD
========================================================
create table USER_MATCH_RECORD (
    "m_id"               INT           not null,
    "m_user_id"          INT,
    "m_type_id"          INT,
    "m_choice_time"      DATE,
    "m_choice_area"      VARCHAR(16),
    "m_choice_form"      INT,
    "m_choice_dimentsions" VARCHAR(512),
    "m_record_time"      DATE,
    "m_operation_process" VARCHAR(1024),
    "m_state"            INT,
    constraint "P_Key_1" primary key ("m_id")
);
``` comment on table USER_MATCH_RECORD is: 'Users matching process record sheet'
alter table USER_MATCH_RECORD
    add constraint "F_Refere" foreign key ("m_type_id")
        references     MTS_SYSTEM_INCIDENT_TYPE ("t_id")
    on delete restrict;

TABLE XVc

Users Matching Process Records Related Fields Table

| Name | Code |
|---|---|
| Primary key ID | m_id |
| User id | m_user_id |
| Event type | m_type_id |
| Select a time | m_choice_time |
| Select region | m_choice_area |
| Select mode | m_choice_form |
| Dimensions conditions | m_choice_dimensions |
| Record Time | m_record_time |
| Operational processes | m_operation_process |
| Status | m_state |

XVI. User Recommendation Form

TABLE XVIa

Users Matching Process Record Sheet Introduction

| Name | User recommendation form |
|---|---|
| Code | MTS_USER_RECOMMEND |
| Database Management Systems | IBM DB2 Version 9.x for z/OS |

TABLE XVIb

Related SQL Statement Users Recommend Tables

```
alter table MTS_USER_RECOMMEND
    drop foreign key "F_Refere";
drop table MTS_USER_RECOMMEND;
========================================================
-- Table: MTS_USER_RECOMMEND
========================================================
create table MTS_USER_RECOMMEND (
    "r_id"        INT         not null,
    "r_user_id"        INT,
    "r_label_id"       INT,
```

TABLE XVIb-continued

Related SQL Statement Users Recommend Tables

"r_weight"     FLOAT(1,2),
constraint "P_Key_1" primary key ("r_id")
);

comment on table MTS_USER_RECOMMEND is: 'User recommendation form'
alter table MTS_USER_RECOMMEND
    add constraint "F_Refere" foreign key ("r_label_id")
        references MTS_INCIDENT_RECOMMEND_LABEL ("l_id")
    on delete restrict;

TABLE XVIc

User Recommendation Tables Related Fields

| Name | Code |
| --- | --- |
| Primary ID | r_id |
| User id | r_user_id |
| Featured Tags id | r_label_id |
| Recommended weight | r_weight |

XVII. Users Operate the Event Log Table

TABLE XVIIa

Introduction to User Action Event Log Table

| Name | Users operate the event log table |
| --- | --- |
| Code | MTS_USER_OPERATION_INCIDENT |
| Database Management Systems | IBM DB2 Version 9.x for z/OS |

TABLE XVIIb

SQL Statement Related to the Event Log Table of User Actions alter table MTS_USER_OPERATION_INCIDENT
    drop foreign key "F_Refere";
drop table MTS_USER_OPERATION_INCIDENT;
--========================================================
-- Table: MTS_USER_OPERATION_INCIDENT
--========================================================
create table MTS_USER_OPERATION_INCIDENT (
    "o_id"    INT    not null,
    "o_user_id"    INT,
    "o_incident_id"    INT,
    "o_info"    VARCHAR(128),
    "o_time"    DATE,
    "o_state"    INT,
    constraint "P_Key_1" primary key ("o_id") .
);

comment on table MTS_USER_OPERATION_INCIDENT is 'Users operate the event log table'
alter table MTS_USER_OPERATION_INCIDENT
    add constraint "F_Refere" foreign key ("o_incident_id")
        references MTS_INCIDENT ("i_id")
    on delete restrict;

TABLE XVIIc

Field Event Records User Actions Related Table

| Name | Code |
| --- | --- |
| Primary key ID | o_id |
| User id | o_user_id |
| Event id | o_incident_id |
| Operating | o_info |
| Time | o_time |
| Status | o_state |

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A user-implemented method for travel planning in real time on an electronic device having at least a processor, a memory and a screen that is connected to a central cloud server through a network connection, comprising the steps of:
    a) user-inputting into the electronic device an input comprising one or more travel events for a selected travel region of interest; and
    b) processing the input in real time, comprising
        i) distributing to an application or components of said application configured to process the input stored on the central cloud server over a Distributed Internet Services system;
        ii) deploying the distributed application or components of said application; and
        iii) executing the deployed application or components of said application to process the input to a best travel recommendation;
    c) creating an initial multidimensional value model comprising:
        iv) receiving information related to the one or more travel events of interest;
        v) storing and categorizing the one or more travel events and information related thereto in a raw information library; and
        vi) establishing a value dimension and value description for the travel events; and
        vii) creating an initial multidimensional value model for the one or more travel events from the value dimension and the value description;
    d) updating the initial multidimensional value model for the user by iterating step c) and modifying the value dimension and value description of the travel event in the initial multidimensional value model to arrive at a modified multidimensional value model; and
    e) outputting to the electronic device in real time the best travel recommendation to the region of interest based on the travel event inputted by the user and the modified multidimensional value model updated for the user.

2. The user-implemented method of claim 1, further comprising:

inputting one or more additional or revised travel events; and repeating steps b) to e) via the distributed cloud computer system.

3. The user-implemented method of claim 1, wherein the initial multidimensional value model comprises weighted values for each item of information comprising the travel event.

4. The method of claim 1, wherein the input comprises buying a ticket or planning a trip.

5. The method of claim 1, wherein the step of establishing a value dimension and value description for the travel event comprises:

analyzing each item of information based on a pre-defined dictionary to establish an initial set of value dimensions of the travel event;

converting the value description into a numerical value via a pre-defined text-value matching table; and adding a weight for each item of information to the value description and the value dimension via a pre-defined weight-value table.

6. The method of claim 5, wherein the step of adding a weight for each item of information to the value description and the value dimension comprises multiplying the weight with the numerical value for each item of information.

7. The method of claim 1, further comprising prior to step d):

adding the user-inputted travel event and related information to the raw information library, if not found in the initial multidimensional model.

8. The method of claim 7, further comprising:

user-inputting an additional travel event; and reiterating steps d) to e).

* * * * *